United States Patent
Liu et al.

(10) Patent No.: US 9,443,541 B1
(45) Date of Patent: Sep. 13, 2016

(54) MAGNETIC WRITER HAVING A GRADIENT IN SATURATION MAGNETIZATION OF THE SHIELDS AND RETURN POLE

(71) Applicant: Western Digital (Fremont), LLC, Fremont, CA (US)

(72) Inventors: Feng Liu, San Ramon, CA (US); El-Amine Salhi, Fremont, CA (US); Ming Sun, San Jose, CA (US); Tao Pan, San Jose, CA (US)

(73) Assignee: WESTERN DIGITAL (FREMONT), LLC, Fremont, CA (US)

( * ) Notice: Subject to any disclaimer, the term of this patent is extended or adjusted under 35 U.S.C. 154(b) by 0 days.

(21) Appl. No.: 14/667,506

(22) Filed: Mar. 24, 2015

(51) Int. Cl.
*G11B 5/11* (2006.01)
*G11B 5/60* (2006.01)
*G11B 5/127* (2006.01)

(52) U.S. Cl.
CPC ............... *G11B 5/11* (2013.01); *G11B 5/1278* (2013.01); *G11B 5/6082* (2013.01)

(58) Field of Classification Search
CPC ... G11B 5/1278; G11B 5/3116; G11B 5/315; G11B 5/11; G11B 5/3163; G11B 5/3146; G11B 5/3143
See application file for complete search history.

(56) References Cited

U.S. PATENT DOCUMENTS

| | | | |
|---|---|---|---|
| 6,016,290 A | 1/2000 | Chen et al. | |
| 6,018,441 A | 1/2000 | Wu et al. | |
| 6,025,978 A * | 2/2000 | Hoshi | G11B 5/3967 360/319 |
| 6,025,988 A | 2/2000 | Yan | |
| 6,032,353 A | 3/2000 | Hiner et al. | |
| 6,033,532 A | 3/2000 | Minami | |
| 6,034,851 A | 3/2000 | Zarouri et al. | |
| 6,043,959 A | 3/2000 | Crue et al. | |
| 6,046,885 A | 4/2000 | Aimonetti et al. | |
| 6,049,650 A | 4/2000 | Jerman et al. | |
| 6,055,138 A | 4/2000 | Shi | |
| 6,058,094 A | 5/2000 | Davis et al. | |
| 6,073,338 A | 6/2000 | Liu et al. | |
| 6,078,479 A | 6/2000 | Nepela et al. | |
| 6,081,499 A | 6/2000 | Berger et al. | |

(Continued)

FOREIGN PATENT DOCUMENTS

JP 10162322 A * 6/1998
JP 2009259365 A * 11/2009

(Continued)

OTHER PUBLICATIONS

Feng Liu, et al., U.S. Appl. No. 14/560,212, filed Dec. 4, 2014, 26 pages.

(Continued)

*Primary Examiner* — Will J Klimowicz
(74) *Attorney, Agent, or Firm* — Convergent Law Group LLP

(57) ABSTRACT

A method and system provide a magnetic transducer. The transducer includes a main pole, a side gap, at least one coil, a side shield and at least one of a leading shield, a trailing shield and a return pole. The coil(s) are configured to energize the main pole. The side gap is between the main pole and the side shield. The main pole is between the leading shield and the trailing shield. The trailing shield is between the main pole and the return pole. The side shield is between the leading shield and the trailing shield. At least one of the leading shield, the trailing shield and the return pole have a gradient in saturation magnetization such that the saturation magnetization varies in a down track direction.

20 Claims, 8 Drawing Sheets

(56) References Cited

U.S. PATENT DOCUMENTS

| | | | |
|---|---|---|---|
| 6,094,803 | A | 8/2000 | Carlson et al. |
| 6,099,362 | A | 8/2000 | Viches et al. |
| 6,103,073 | A | 8/2000 | Thayamballi |
| 6,108,166 | A | 8/2000 | Lederman |
| 6,118,629 | A | 9/2000 | Huai et al. |
| 6,118,638 | A | 9/2000 | Knapp et al. |
| 6,125,018 | A | 9/2000 | Takagishi et al. |
| 6,130,779 | A | 10/2000 | Carlson et al. |
| 6,134,089 | A | 10/2000 | Barr et al. |
| 6,136,166 | A | 10/2000 | Shen et al. |
| 6,137,661 | A | 10/2000 | Shi et al. |
| 6,137,662 | A | 10/2000 | Huai et al. |
| 6,160,684 | A | 12/2000 | Heist et al. |
| 6,163,426 | A | 12/2000 | Nepela et al. |
| 6,166,891 | A | 12/2000 | Lederman et al. |
| 6,173,486 | B1 | 1/2001 | Hsiao et al. |
| 6,175,476 | B1 | 1/2001 | Huai et al. |
| 6,178,066 | B1 | 1/2001 | Barr |
| 6,178,070 | B1 | 1/2001 | Hong et al. |
| 6,178,150 | B1 | 1/2001 | Davis |
| 6,181,485 | B1 | 1/2001 | He |
| 6,181,525 | B1 | 1/2001 | Carlson |
| 6,185,051 | B1 | 2/2001 | Chen et al. |
| 6,185,077 | B1 | 2/2001 | Tong et al. |
| 6,185,081 | B1 | 2/2001 | Simion et al. |
| 6,188,549 | B1 | 2/2001 | Wiitala |
| 6,190,764 | B1 | 2/2001 | Shi et al. |
| 6,193,584 | B1 | 2/2001 | Rudy et al. |
| 6,195,229 | B1 | 2/2001 | Shen et al. |
| 6,198,608 | B1 | 3/2001 | Hong et al. |
| 6,198,609 | B1 | 3/2001 | Barr et al. |
| 6,201,673 | B1 | 3/2001 | Rottmayer et al. |
| 6,204,998 | B1 | 3/2001 | Katz |
| 6,204,999 | B1 | 3/2001 | Crue et al. |
| 6,212,153 | B1 | 4/2001 | Chen et al. |
| 6,215,625 | B1 | 4/2001 | Carlson |
| 6,219,205 | B1 | 4/2001 | Yuan et al. |
| 6,221,218 | B1 | 4/2001 | Shi et al. |
| 6,222,707 | B1 | 4/2001 | Huai et al. |
| 6,229,782 | B1 | 5/2001 | Wang et al. |
| 6,230,959 | B1 | 5/2001 | Heist et al. |
| 6,233,116 | B1 | 5/2001 | Chen et al. |
| 6,233,125 | B1 | 5/2001 | Knapp et al. |
| 6,237,215 | B1 | 5/2001 | Hunsaker et al. |
| 6,252,743 | B1 | 6/2001 | Bozorgi |
| 6,255,721 | B1 | 7/2001 | Roberts |
| 6,258,468 | B1 | 7/2001 | Mahvan et al. |
| 6,266,216 | B1 | 7/2001 | Hikami et al. |
| 6,271,604 | B1 | 8/2001 | Frank, Jr. et al. |
| 6,275,354 | B1 | 8/2001 | Huai et al. |
| 6,277,505 | B1 | 8/2001 | Shi et al. |
| 6,282,056 | B1 | 8/2001 | Feng et al. |
| 6,296,955 | B1 | 10/2001 | Hossain et al. |
| 6,297,955 | B1 | 10/2001 | Frank, Jr. et al. |
| 6,304,414 | B1 | 10/2001 | Crue, Jr. et al. |
| 6,306,311 | B1 * | 10/2001 | Han .................. B82Y 10/00 216/22 |
| 6,307,715 | B1 | 10/2001 | Berding et al. |
| 6,310,746 | B1 | 10/2001 | Hawwa et al. |
| 6,310,750 | B1 | 10/2001 | Hawwa et al. |
| 6,317,290 | B1 | 11/2001 | Wang et al. |
| 6,317,297 | B1 | 11/2001 | Tong et al. |
| 6,322,911 | B1 | 11/2001 | Fukagawa et al. |
| 6,330,136 | B1 | 12/2001 | Wang et al. |
| 6,330,137 | B1 | 12/2001 | Knapp et al. |
| 6,333,830 | B2 | 12/2001 | Rose et al. |
| 6,340,533 | B1 | 1/2002 | Ueno et al. |
| 6,349,014 | B1 | 2/2002 | Crue, Jr. et al. |
| 6,351,355 | B1 | 2/2002 | Min et al. |
| 6,353,318 | B1 | 3/2002 | Sin et al. |
| 6,353,511 | B1 | 3/2002 | Shi et al. |
| 6,356,412 | B1 | 3/2002 | Levi et al. |
| 6,359,779 | B1 | 3/2002 | Frank, Jr. et al. |
| 6,369,983 | B1 | 4/2002 | Hong |
| 6,376,964 | B1 | 4/2002 | Young et al. |
| 6,377,535 | B1 | 4/2002 | Chen et al. |
| 6,381,095 | B1 | 4/2002 | Sin et al. |
| 6,381,105 | B1 | 4/2002 | Huai et al. |
| 6,389,499 | B1 | 5/2002 | Frank, Jr. et al. |
| 6,392,850 | B1 | 5/2002 | Tong et al. |
| 6,396,660 | B1 | 5/2002 | Jensen et al. |
| 6,399,179 | B1 | 6/2002 | Hanrahan et al. |
| 6,400,526 | B2 | 6/2002 | Crue, Jr. et al. |
| 6,404,600 | B1 | 6/2002 | Hawwa et al. |
| 6,404,601 | B1 | 6/2002 | Rottmayer et al. |
| 6,404,706 | B1 | 6/2002 | Stovall et al. |
| 6,410,170 | B1 | 6/2002 | Chen et al. |
| 6,411,522 | B1 | 6/2002 | Frank, Jr. et al. |
| 6,417,998 | B1 | 7/2002 | Crue, Jr. et al. |
| 6,417,999 | B1 | 7/2002 | Knapp et al. |
| 6,418,000 | B1 | 7/2002 | Gibbons et al. |
| 6,418,048 | B1 | 7/2002 | Sin et al. |
| 6,421,211 | B1 | 7/2002 | Hawwa et al. |
| 6,421,212 | B1 | 7/2002 | Gibbons et al. |
| 6,424,505 | B1 | 7/2002 | Lam et al. |
| 6,424,507 | B1 | 7/2002 | Lederman et al. |
| 6,430,009 | B1 | 8/2002 | Komaki et al. |
| 6,430,806 | B1 | 8/2002 | Chen et al. |
| 6,433,965 | B1 | 8/2002 | Gopinathan et al. |
| 6,433,968 | B1 | 8/2002 | Shi et al. |
| 6,433,970 | B1 | 8/2002 | Knapp et al. |
| 6,437,945 | B1 | 8/2002 | Hawwa et al. |
| 6,445,536 | B1 | 9/2002 | Rudy et al. |
| 6,445,542 | B1 | 9/2002 | Levi et al. |
| 6,445,553 | B2 | 9/2002 | Barr et al. |
| 6,445,554 | B1 | 9/2002 | Dong et al. |
| 6,447,935 | B1 | 9/2002 | Zhang et al. |
| 6,448,765 | B1 | 9/2002 | Chen et al. |
| 6,451,514 | B1 | 9/2002 | Iitsuka |
| 6,452,742 | B1 | 9/2002 | Crue et al. |
| 6,452,765 | B1 | 9/2002 | Mahvan et al. |
| 6,456,465 | B1 | 9/2002 | Louis et al. |
| 6,459,552 | B1 | 10/2002 | Liu et al. |
| 6,462,920 | B1 | 10/2002 | Karimi |
| 6,466,401 | B1 | 10/2002 | Hong et al. |
| 6,466,402 | B1 | 10/2002 | Crue, Jr. et al. |
| 6,466,404 | B1 | 10/2002 | Crue, Jr. et al. |
| 6,468,436 | B1 | 10/2002 | Shi et al. |
| 6,469,877 | B1 | 10/2002 | Knapp et al. |
| 6,477,019 | B2 | 11/2002 | Matono et al. |
| 6,479,096 | B1 | 11/2002 | Shi et al. |
| 6,483,662 | B1 | 11/2002 | Thomas et al. |
| 6,487,040 | B1 | 11/2002 | Hsiao et al. |
| 6,487,056 | B1 | 11/2002 | Gibbons et al. |
| 6,490,125 | B1 | 12/2002 | Barr |
| 6,496,330 | B1 | 12/2002 | Crue, Jr. et al. |
| 6,496,334 | B1 | 12/2002 | Pang et al. |
| 6,504,676 | B1 | 1/2003 | Hiner et al. |
| 6,512,657 | B2 | 1/2003 | Heist et al. |
| 6,512,659 | B1 | 1/2003 | Hawwa et al. |
| 6,512,661 | B1 | 1/2003 | Louis |
| 6,512,690 | B1 | 1/2003 | Qi et al. |
| 6,515,573 | B1 | 2/2003 | Dong et al. |
| 6,515,791 | B1 | 2/2003 | Hawwa et al. |
| 6,532,823 | B1 | 3/2003 | Knapp et al. |
| 6,535,363 | B1 | 3/2003 | Hosomi et al. |
| 6,552,874 | B1 | 4/2003 | Chen et al. |
| 6,552,928 | B1 | 4/2003 | Qi et al. |
| 6,577,470 | B1 | 6/2003 | Rumpler |
| 6,583,961 | B2 | 6/2003 | Levi et al. |
| 6,583,966 | B2 * | 6/2003 | Han .................. B82Y 10/00 360/125.43 |
| 6,583,968 | B1 | 6/2003 | Scura et al. |
| 6,597,548 | B1 | 7/2003 | Yamanaka et al. |
| 6,611,398 | B1 | 8/2003 | Rumpler et al. |
| 6,618,223 | B1 | 9/2003 | Chen et al. |
| 6,629,357 | B1 | 10/2003 | Akoh |
| 6,633,464 | B2 | 10/2003 | Lai et al. |
| 6,636,394 | B1 | 10/2003 | Fukagawa et al. |
| 6,639,291 | B1 | 10/2003 | Sin et al. |
| 6,650,503 | B1 | 11/2003 | Chen et al. |
| 6,650,506 | B1 | 11/2003 | Risse |
| 6,654,195 | B1 | 11/2003 | Frank, Jr. et al. |
| 6,657,816 | B1 | 12/2003 | Barr et al. |

(56) References Cited

U.S. PATENT DOCUMENTS

| | | |
|---|---|---|
| 6,661,621 B1 | 12/2003 | Iitsuka |
| 6,661,625 B1 | 12/2003 | Sin et al. |
| 6,674,610 B1 | 1/2004 | Thomas et al. |
| 6,680,863 B1 | 1/2004 | Shi et al. |
| 6,683,763 B1 | 1/2004 | Hiner et al. |
| 6,687,098 B1 | 2/2004 | Huai |
| 6,687,178 B1 | 2/2004 | Qi et al. |
| 6,687,977 B2 | 2/2004 | Knapp et al. |
| 6,691,226 B1 | 2/2004 | Frank, Jr. et al. |
| 6,697,294 B1 | 2/2004 | Qi et al. |
| 6,700,738 B1 | 3/2004 | Sin et al. |
| 6,700,759 B1 | 3/2004 | Knapp et al. |
| 6,704,158 B2 | 3/2004 | Hawwa et al. |
| 6,707,083 B1 | 3/2004 | Hiner et al. |
| 6,713,801 B1 | 3/2004 | Sin et al. |
| 6,721,138 B1 | 4/2004 | Chen et al. |
| 6,721,149 B1 | 4/2004 | Shi et al. |
| 6,721,203 B1 | 4/2004 | Qi et al. |
| 6,724,569 B1 | 4/2004 | Chen et al. |
| 6,724,572 B1 | 4/2004 | Stoev et al. |
| 6,729,015 B2 | 5/2004 | Matono et al. |
| 6,735,850 B1 | 5/2004 | Gibbons et al. |
| 6,737,281 B1 | 5/2004 | Dang et al. |
| 6,744,608 B1 | 6/2004 | Sin et al. |
| 6,747,301 B1 | 6/2004 | Hiner et al. |
| 6,751,055 B1 | 6/2004 | Alfoqaha et al. |
| 6,754,049 B1 | 6/2004 | Seagle et al. |
| 6,756,071 B1 | 6/2004 | Shi et al. |
| 6,757,140 B1 | 6/2004 | Hawwa |
| 6,760,196 B1 | 7/2004 | Niu et al. |
| 6,762,910 B1 | 7/2004 | Knapp et al. |
| 6,765,756 B1 | 7/2004 | Hong et al. |
| 6,775,902 B1 | 8/2004 | Huai et al. |
| 6,778,358 B1 | 8/2004 | Jiang et al. |
| 6,781,927 B1 | 8/2004 | Heanuc et al. |
| 6,785,955 B1 | 9/2004 | Chen et al. |
| 6,791,793 B1 | 9/2004 | Chen et al. |
| 6,791,807 B1 | 9/2004 | Hikami et al. |
| 6,798,616 B1 | 9/2004 | Seagle et al. |
| 6,798,625 B1 | 9/2004 | Ueno et al. |
| 6,801,408 B1 | 10/2004 | Chen et al. |
| 6,801,411 B1 | 10/2004 | Lederman et al. |
| 6,803,615 B1 | 10/2004 | Sin et al. |
| 6,806,035 B1 | 10/2004 | Atireklapvarodom et al. |
| 6,807,030 B1 | 10/2004 | Hawwa et al. |
| 6,807,332 B1 | 10/2004 | Hawwa |
| 6,809,899 B1 | 10/2004 | Chen et al. |
| 6,816,345 B1 | 11/2004 | Knapp et al. |
| 6,828,897 B1 | 12/2004 | Nepela |
| 6,829,160 B1 | 12/2004 | Qi et al. |
| 6,829,819 B1 | 12/2004 | Crue, Jr. et al. |
| 6,833,979 B1 | 12/2004 | Knapp et al. |
| 6,834,010 B1 | 12/2004 | Qi et al. |
| 6,859,343 B1 | 2/2005 | Alfoqaha et al. |
| 6,859,997 B1 | 3/2005 | Tong et al. |
| 6,861,937 B1 | 3/2005 | Feng et al. |
| 6,870,712 B2 | 3/2005 | Chen et al. |
| 6,873,494 B2 | 3/2005 | Chen et al. |
| 6,873,547 B1 | 3/2005 | Shi et al. |
| 6,879,464 B2 | 4/2005 | Sun et al. |
| 6,888,184 B1 | 5/2005 | Shi et al. |
| 6,888,704 B1 | 5/2005 | Diao et al. |
| 6,891,702 B1 | 5/2005 | Tang |
| 6,894,871 B2 | 5/2005 | Alfoqaha et al. |
| 6,894,877 B1 | 5/2005 | Crue, Jr. et al. |
| 6,906,894 B2 | 6/2005 | Chen et al. |
| 6,909,578 B1 | 6/2005 | Missell et al. |
| 6,912,106 B1 | 6/2005 | Chen et al. |
| 6,934,113 B1 | 8/2005 | Chen |
| 6,934,129 B1 | 8/2005 | Zhang et al. |
| 6,940,688 B2 | 9/2005 | Jiang et al. |
| 6,942,824 B1 | 9/2005 | Li |
| 6,943,993 B2 | 9/2005 | Chang et al. |
| 6,944,938 B1 | 9/2005 | Crue, Jr. et al. |
| 6,947,258 B1 | 9/2005 | Li |
| 6,950,266 B1 | 9/2005 | McCaslin et al. |
| 6,954,332 B1 | 10/2005 | Hong et al. |
| 6,958,885 B1 | 10/2005 | Chen et al. |
| 6,961,221 B1 | 11/2005 | Niu et al. |
| 6,969,989 B1 | 11/2005 | Mei |
| 6,975,486 B2 | 12/2005 | Chen et al. |
| 6,987,643 B1 | 1/2006 | Seagle |
| 6,989,962 B1 | 1/2006 | Dong et al. |
| 6,989,972 B1 | 1/2006 | Stoev et al. |
| 7,006,327 B2 | 2/2006 | Krounbi et al. |
| 7,007,372 B1 | 3/2006 | Chen et al. |
| 7,012,832 B1 | 3/2006 | Sin et al. |
| 7,023,658 B1 | 4/2006 | Knapp et al. |
| 7,026,063 B2 | 4/2006 | Ueno et al. |
| 7,027,268 B1 | 4/2006 | Zhu et al. |
| 7,027,274 B1 | 4/2006 | Sin et al. |
| 7,035,046 B1 | 4/2006 | Young et al. |
| 7,041,985 B1 | 5/2006 | Wang et al. |
| 7,046,490 B1 | 5/2006 | Ueno et al. |
| 7,054,113 B1 | 5/2006 | Seagle et al. |
| 7,057,857 B1 | 6/2006 | Niu et al. |
| 7,059,868 B1 | 6/2006 | Yan |
| 7,092,195 B1 | 8/2006 | Liu et al. |
| 7,110,289 B1 | 9/2006 | Sin et al. |
| 7,111,382 B1 | 9/2006 | Knapp et al. |
| 7,113,366 B1 | 9/2006 | Wang et al. |
| 7,114,241 B2 | 10/2006 | Kubota et al. |
| 7,116,517 B1 | 10/2006 | He et al. |
| 7,124,654 B1 | 10/2006 | Davies et al. |
| 7,126,788 B1 | 10/2006 | Liu et al. |
| 7,126,790 B1 | 10/2006 | Liu et al. |
| 7,131,346 B1 | 11/2006 | Buttar et al. |
| 7,133,253 B1 | 11/2006 | Seagle et al. |
| 7,134,185 B1 | 11/2006 | Knapp et al. |
| 7,154,715 B2 | 12/2006 | Yamanaka et al. |
| 7,170,725 B1 | 1/2007 | Zhou et al. |
| 7,177,117 B1 | 2/2007 | Jiang et al. |
| 7,193,815 B1 | 3/2007 | Stoev et al. |
| 7,196,880 B1 | 3/2007 | Anderson et al. |
| 7,199,974 B1 | 4/2007 | Alfoqaha |
| 7,199,975 B1 | 4/2007 | Pan |
| 7,211,339 B1 | 5/2007 | Seagle et al. |
| 7,212,384 B1 | 5/2007 | Stoev et al. |
| 7,238,292 B1 | 7/2007 | He et al. |
| 7,239,478 B1 | 7/2007 | Sin et al. |
| 7,248,431 B1 | 7/2007 | Liu et al. |
| 7,248,433 B1 | 7/2007 | Stoev et al. |
| 7,248,449 B1 | 7/2007 | Seagle |
| 7,280,325 B1 | 10/2007 | Pan |
| 7,283,327 B1 | 10/2007 | Liu et al. |
| 7,284,316 B1 | 10/2007 | Huai et al. |
| 7,286,329 B1 | 10/2007 | Chen et al. |
| 7,289,303 B1 | 10/2007 | Sin et al. |
| 7,292,409 B1 | 11/2007 | Stoev et al. |
| 7,293,344 B2 * | 11/2007 | Han ............... G11B 5/1272<br>204/192.1 |
| 7,296,339 B1 | 11/2007 | Yang et al. |
| 7,307,814 B1 | 12/2007 | Seagle et al. |
| 7,307,818 B1 | 12/2007 | Park et al. |
| 7,310,204 B1 | 12/2007 | Stoev et al. |
| 7,318,947 B1 | 1/2008 | Park et al. |
| 7,333,295 B1 | 2/2008 | Medina et al. |
| 7,337,530 B1 | 3/2008 | Stoev et al. |
| 7,342,752 B1 | 3/2008 | Zhang et al. |
| 7,349,170 B1 | 3/2008 | Rudman et al. |
| 7,349,179 B1 | 3/2008 | He et al. |
| 7,354,664 B1 | 4/2008 | Jiang et al. |
| 7,363,697 B1 | 4/2008 | Dunn et al. |
| 7,371,152 B1 | 5/2008 | Newman |
| 7,372,665 B1 | 5/2008 | Stoev et al. |
| 7,375,926 B1 | 5/2008 | Stoev et al. |
| 7,379,269 B1 | 5/2008 | Krounbi et al. |
| 7,386,933 B1 | 6/2008 | Krounbi et al. |
| 7,389,577 B1 | 6/2008 | Shang et al. |
| 7,417,832 B1 | 8/2008 | Erickson et al. |
| 7,419,891 B1 | 9/2008 | Chen et al. |
| 7,428,124 B1 | 9/2008 | Song et al. |
| 7,430,098 B1 | 9/2008 | Song et al. |
| 7,436,620 B1 | 10/2008 | Kang et al. |

(56) References Cited

U.S. PATENT DOCUMENTS

| | | |
|---|---|---|
| 7,436,638 B1 | 10/2008 | Pan |
| 7,440,220 B1 | 10/2008 | Kang et al. |
| 7,443,632 B1 | 10/2008 | Stoev et al. |
| 7,444,740 B1 | 11/2008 | Chung et al. |
| 7,493,688 B1 | 2/2009 | Wang et al. |
| 7,508,627 B1 | 3/2009 | Zhang et al. |
| 7,522,377 B1 | 4/2009 | Jiang et al. |
| 7,522,379 B1 | 4/2009 | Krounbi et al. |
| 7,522,382 B1 | 4/2009 | Pan |
| 7,538,976 B2 | 5/2009 | Hsiao et al. |
| 7,542,246 B1 | 6/2009 | Song et al. |
| 7,551,406 B1 | 6/2009 | Thomas et al. |
| 7,552,523 B1 | 6/2009 | He et al. |
| 7,554,767 B1 | 6/2009 | Hu et al. |
| 7,583,466 B2 | 9/2009 | Kermiche et al. |
| 7,595,967 B1 | 9/2009 | Moon et al. |
| 7,639,457 B1 | 12/2009 | Chen et al. |
| 7,660,080 B1 | 2/2010 | Liu et al. |
| 7,672,080 B1 | 3/2010 | Tang et al. |
| 7,672,086 B1 | 3/2010 | Jiang |
| 7,684,160 B1 | 3/2010 | Erickson et al. |
| 7,688,546 B1 | 3/2010 | Bai et al. |
| 7,691,434 B1 | 4/2010 | Zhang et al. |
| 7,695,761 B1 | 4/2010 | Shen et al. |
| 7,715,152 B2 * | 5/2010 | Okada ............ G11B 5/11 360/125.13 |
| 7,719,795 B2 | 5/2010 | Hu et al. |
| 7,726,009 B1 | 6/2010 | Liu et al. |
| 7,729,086 B1 | 6/2010 | Song et al. |
| 7,729,087 B1 | 6/2010 | Stoev et al. |
| 7,736,823 B1 | 6/2010 | Wang et al. |
| 7,785,666 B1 | 8/2010 | Sun et al. |
| 7,796,356 B1 | 9/2010 | Fowler et al. |
| 7,800,858 B1 | 9/2010 | Bajikar et al. |
| 7,819,979 B1 | 10/2010 | Chen et al. |
| 7,829,264 B1 | 11/2010 | Wang et al. |
| 7,846,643 B1 | 12/2010 | Sun et al. |
| 7,855,854 B2 | 12/2010 | Hu et al. |
| 7,869,160 B1 | 1/2011 | Pan et al. |
| 7,872,824 B1 | 1/2011 | Macchioni et al. |
| 7,872,833 B2 | 1/2011 | Hu et al. |
| 7,910,267 B1 | 3/2011 | Zeng et al. |
| 7,911,735 B1 | 3/2011 | Sin et al. |
| 7,911,737 B1 | 3/2011 | Jiang et al. |
| 7,916,426 B2 | 3/2011 | Hu et al. |
| 7,918,013 B1 | 4/2011 | Dunn et al. |
| 7,968,219 B1 | 6/2011 | Jiang et al. |
| 7,982,989 B1 | 7/2011 | Shi et al. |
| 8,000,064 B2 | 8/2011 | Kawano et al. |
| 8,008,912 B1 | 8/2011 | Shang |
| 8,012,804 B1 | 9/2011 | Wang et al. |
| 8,015,692 B1 | 9/2011 | Zhang et al. |
| 8,018,677 B1 | 9/2011 | Chung et al. |
| 8,018,678 B1 | 9/2011 | Zhang et al. |
| 8,024,748 B1 | 9/2011 | Moravec et al. |
| 8,068,311 B2 | 11/2011 | Hsiao et al. |
| 8,072,705 B1 | 12/2011 | Wang et al. |
| 8,074,345 B1 | 12/2011 | Anguelouch et al. |
| 8,077,418 B1 | 12/2011 | Hu et al. |
| 8,077,434 B1 | 12/2011 | Shen et al. |
| 8,077,435 B1 | 12/2011 | Liu et al. |
| 8,077,557 B1 | 12/2011 | Hu et al. |
| 8,079,135 B1 | 12/2011 | Shen et al. |
| 8,081,403 B1 | 12/2011 | Chen et al. |
| 8,085,498 B2 | 12/2011 | Bai et al. |
| 8,091,210 B1 | 1/2012 | Sasaki et al. |
| 8,097,846 B1 | 1/2012 | Anguelouch et al. |
| 8,104,166 B1 | 1/2012 | Zhang et al. |
| 8,116,043 B2 | 2/2012 | Leng et al. |
| 8,116,171 B1 | 2/2012 | Lee |
| 8,125,856 B1 | 2/2012 | Li et al. |
| 8,134,794 B1 | 3/2012 | Wang |
| 8,136,224 B1 | 3/2012 | Sun et al. |
| 8,136,225 B1 | 3/2012 | Zhang et al. |
| 8,136,805 B1 | 3/2012 | Lee |
| 8,141,235 B1 | 3/2012 | Zhang |
| 8,146,236 B1 | 4/2012 | Luo et al. |
| 8,149,536 B1 | 4/2012 | Yang et al. |
| 8,151,441 B1 | 4/2012 | Rudy et al. |
| 8,163,185 B1 | 4/2012 | Sun et al. |
| 8,164,760 B2 | 4/2012 | Willis |
| 8,164,853 B2 * | 4/2012 | Hirata ............... G11B 5/315 360/125.3 |
| 8,164,855 B1 | 4/2012 | Gibbons et al. |
| 8,164,864 B2 | 4/2012 | Kaiser et al. |
| 8,165,709 B1 | 4/2012 | Rudy |
| 8,166,631 B1 | 5/2012 | Tran et al. |
| 8,166,632 B1 | 5/2012 | Zhang et al. |
| 8,169,473 B1 | 5/2012 | Yu et al. |
| 8,171,618 B1 | 5/2012 | Wang et al. |
| 8,179,636 B1 | 5/2012 | Bai et al. |
| 8,184,399 B2 | 5/2012 | Wu et al. |
| 8,191,237 B1 | 6/2012 | Luo et al. |
| 8,194,365 B1 | 6/2012 | Leng et al. |
| 8,194,366 B1 | 6/2012 | Li et al. |
| 8,196,285 B1 | 6/2012 | Zhang et al. |
| 8,200,054 B1 | 6/2012 | Li et al. |
| 8,203,800 B2 | 6/2012 | Li et al. |
| 8,208,350 B1 | 6/2012 | Hu et al. |
| 8,220,140 B1 | 7/2012 | Wang et al. |
| 8,222,599 B1 | 7/2012 | Chien |
| 8,225,488 B1 | 7/2012 | Zhang et al. |
| 8,227,023 B1 | 7/2012 | Liu et al. |
| 8,228,633 B1 | 7/2012 | Tran et al. |
| 8,231,796 B1 | 7/2012 | Li et al. |
| 8,233,248 B1 | 7/2012 | Li et al. |
| 8,248,896 B1 | 8/2012 | Yuan et al. |
| 8,254,059 B2 * | 8/2012 | Horide ............ G11B 5/1278 360/125.03 |
| 8,254,060 B1 | 8/2012 | Shi et al. |
| 8,257,597 B1 | 9/2012 | Guan et al. |
| 8,259,410 B1 | 9/2012 | Bai et al. |
| 8,259,539 B1 | 9/2012 | Hu et al. |
| 8,262,918 B1 | 9/2012 | Li et al. |
| 8,262,919 B1 | 9/2012 | Luo et al. |
| 8,264,797 B2 | 9/2012 | Emley |
| 8,264,798 B1 | 9/2012 | Guan et al. |
| 8,270,126 B1 | 9/2012 | Roy et al. |
| 8,276,258 B1 | 10/2012 | Tran et al. |
| 8,277,669 B1 | 10/2012 | Chen et al. |
| 8,279,719 B1 | 10/2012 | Hu et al. |
| 8,284,517 B1 | 10/2012 | Sun et al. |
| 8,288,204 B1 | 10/2012 | Wang et al. |
| 8,289,821 B1 | 10/2012 | Huber |
| 8,291,743 B1 | 10/2012 | Shi et al. |
| 8,300,359 B2 | 10/2012 | Hirata et al. |
| 8,307,539 B1 | 11/2012 | Rudy et al. |
| 8,307,540 B1 | 11/2012 | Tran et al. |
| 8,308,921 B1 | 11/2012 | Hiner et al. |
| 8,310,785 B1 | 11/2012 | Zhang et al. |
| 8,310,901 B1 | 11/2012 | Batra et al. |
| 8,315,019 B1 | 11/2012 | Mao et al. |
| 8,316,527 B2 | 11/2012 | Hong et al. |
| 8,320,076 B1 | 11/2012 | Shen et al. |
| 8,320,077 B1 | 11/2012 | Tang et al. |
| 8,320,219 B1 | 11/2012 | Wolf et al. |
| 8,320,220 B1 | 11/2012 | Yuan et al. |
| 8,320,722 B1 | 11/2012 | Yuan et al. |
| 8,322,022 B1 | 12/2012 | Yi et al. |
| 8,322,023 B1 | 12/2012 | Zeng et al. |
| 8,325,569 B1 | 12/2012 | Shi et al. |
| 8,333,008 B1 | 12/2012 | Sin et al. |
| 8,334,093 B2 | 12/2012 | Zhang et al. |
| 8,336,194 B2 | 12/2012 | Yuan et al. |
| 8,339,738 B1 | 12/2012 | Tran et al. |
| 8,339,749 B2 * | 12/2012 | Mochizuki ............ B82Y 10/00 360/123.12 |
| 8,341,826 B1 | 1/2013 | Jiang et al. |
| 8,343,319 B1 | 1/2013 | Li et al. |
| 8,343,364 B1 | 1/2013 | Gao et al. |
| 8,349,195 B1 | 1/2013 | Si et al. |
| 8,351,307 B1 | 1/2013 | Wolf et al. |
| 8,357,244 B1 | 1/2013 | Zhao et al. |
| 8,373,945 B1 | 2/2013 | Luo et al. |

(56) References Cited

U.S. PATENT DOCUMENTS

| | | | |
|---|---|---|---|
| 8,375,564 B1 | 2/2013 | Luo et al. |
| 8,375,565 B2 | 2/2013 | Hu et al. |
| 8,381,391 B2 | 2/2013 | Park et al. |
| 8,385,157 B1 | 2/2013 | Champion et al. |
| 8,385,158 B1 | 2/2013 | Hu et al. |
| 8,394,280 B1 | 3/2013 | Wan et al. |
| 8,400,731 B1 | 3/2013 | Li et al. |
| 8,404,128 B1 | 3/2013 | Zhang et al. |
| 8,404,129 B1 | 3/2013 | Luo et al. |
| 8,405,930 B1 | 3/2013 | Li et al. |
| 8,409,453 B1 | 4/2013 | Jiang et al. |
| 8,413,317 B1 | 4/2013 | Wan et al. |
| 8,416,540 B1 | 4/2013 | Li et al. |
| 8,419,953 B1 | 4/2013 | Su et al. |
| 8,419,954 B1 | 4/2013 | Chen et al. |
| 8,422,176 B1 | 4/2013 | Leng et al. |
| 8,422,342 B1 | 4/2013 | Lee |
| 8,422,841 B1 | 4/2013 | Shi et al. |
| 8,424,192 B1 | 4/2013 | Yang et al. |
| 8,441,756 B1 | 5/2013 | Sun et al. |
| 8,443,510 B1 | 5/2013 | Shi et al. |
| 8,444,866 B1 | 5/2013 | Guan et al. |
| 8,449,948 B2 | 5/2013 | Medina et al. |
| 8,451,556 B1 | 5/2013 | Wang et al. |
| 8,451,563 B1 | 5/2013 | Zhang et al. |
| 8,454,846 B1 | 6/2013 | Zhou et al. |
| 8,455,119 B1 | 6/2013 | Jiang et al. |
| 8,456,961 B1 | 6/2013 | Wang et al. |
| 8,456,963 B1 | 6/2013 | Hu et al. |
| 8,456,964 B1 | 6/2013 | Yuan et al. |
| 8,456,966 B1 | 6/2013 | Shi et al. |
| 8,456,967 B1 | 6/2013 | Mallary |
| 8,458,892 B2 | 6/2013 | Si et al. |
| 8,462,592 B1 | 6/2013 | Wolf et al. |
| 8,468,682 B1 | 6/2013 | Zhang |
| 8,472,136 B2 * | 6/2013 | Batra | G11B 5/3116 360/119.04 |
| 8,472,139 B2 * | 6/2013 | Urakami | G11B 5/1278 360/119.02 |
| 8,472,288 B1 | 6/2013 | Wolf et al. |
| 8,480,911 B1 | 7/2013 | Osugi et al. |
| 8,486,285 B2 | 7/2013 | Zhou et al. |
| 8,486,286 B1 | 7/2013 | Gao et al. |
| 8,488,272 B1 | 7/2013 | Tran et al. |
| 8,491,801 B1 | 7/2013 | Tanner et al. |
| 8,491,802 B1 | 7/2013 | Gao et al. |
| 8,493,693 B1 | 7/2013 | Zheng et al. |
| 8,493,695 B1 | 7/2013 | Kaiser et al. |
| 8,495,813 B1 | 7/2013 | Hu et al. |
| 8,498,079 B1 | 7/2013 | Song et al. |
| 8,498,084 B1 | 7/2013 | Leng et al. |
| 8,499,435 B2 | 8/2013 | Sasaki et al. |
| 8,506,828 B1 | 8/2013 | Osugi et al. |
| 8,514,517 B1 | 8/2013 | Batra et al. |
| 8,514,519 B2 * | 8/2013 | Gurney | G11B 5/3133 360/125.3 |
| 8,518,279 B1 | 8/2013 | Wang et al. |
| 8,518,832 B1 | 8/2013 | Yang et al. |
| 8,520,336 B1 | 8/2013 | Liu et al. |
| 8,520,337 B1 | 8/2013 | Liu et al. |
| 8,524,068 B2 | 9/2013 | Medina et al. |
| 8,526,275 B1 | 9/2013 | Yuan et al. |
| 8,531,801 B1 | 9/2013 | Xiao et al. |
| 8,532,450 B1 | 9/2013 | Wang et al. |
| 8,533,937 B1 | 9/2013 | Wang et al. |
| 8,537,494 B1 | 9/2013 | Pan et al. |
| 8,537,495 B1 | 9/2013 | Luo et al. |
| 8,537,502 B1 | 9/2013 | Park et al. |
| 8,542,461 B2 | 9/2013 | Bai et al. |
| 8,545,999 B1 | 10/2013 | Leng et al. |
| 8,547,659 B1 | 10/2013 | Bai et al. |
| 8,547,667 B1 | 10/2013 | Roy et al. |
| 8,547,730 B1 | 10/2013 | Shen et al. |
| 8,555,486 B1 | 10/2013 | Medina et al. |
| 8,559,123 B2 | 10/2013 | Hirata et al. |
| 8,559,141 B1 | 10/2013 | Pakala et al. |
| 8,563,146 B1 | 10/2013 | Zhang et al. |
| 8,565,049 B1 | 10/2013 | Tanner et al. |
| 8,576,514 B2 | 11/2013 | Sasaki et al. |
| 8,576,517 B1 | 11/2013 | Tran et al. |
| 8,578,594 B2 | 11/2013 | Jiang et al. |
| 8,582,238 B1 * | 11/2013 | Liu | G11B 5/1278 360/125.3 |
| 8,582,241 B1 | 11/2013 | Yu et al. |
| 8,582,253 B1 | 11/2013 | Zheng et al. |
| 8,588,039 B1 | 11/2013 | Shi et al. |
| 8,593,761 B1 | 11/2013 | Liu et al. |
| 8,593,914 B2 | 11/2013 | Wang et al. |
| 8,597,528 B1 | 12/2013 | Roy et al. |
| 8,599,520 B1 | 12/2013 | Liu et al. |
| 8,599,657 B1 | 12/2013 | Lee |
| 8,603,593 B1 | 12/2013 | Roy et al. |
| 8,607,438 B1 | 12/2013 | Gao et al. |
| 8,607,439 B1 | 12/2013 | Wang et al. |
| 8,611,035 B1 | 12/2013 | Bajikar et al. |
| 8,611,054 B1 | 12/2013 | Shang et al. |
| 8,611,055 B1 | 12/2013 | Pakala et al. |
| 8,614,864 B1 | 12/2013 | Hong et al. |
| 8,619,389 B1 | 12/2013 | Saito et al. |
| 8,619,512 B1 | 12/2013 | Yuan et al. |
| 8,625,233 B1 | 1/2014 | Ji et al. |
| 8,625,941 B1 | 1/2014 | Shi et al. |
| 8,628,672 B1 | 1/2014 | Si et al. |
| 8,630,068 B1 | 1/2014 | Mauri et al. |
| 8,634,280 B1 | 1/2014 | Wang et al. |
| 8,638,529 B1 | 1/2014 | Leng et al. |
| 8,643,980 B1 | 2/2014 | Fowler et al. |
| 8,649,123 B1 | 2/2014 | Zhang et al. |
| 8,665,561 B1 | 3/2014 | Knutson et al. |
| 8,670,211 B1 | 3/2014 | Sun et al. |
| 8,670,213 B1 | 3/2014 | Zeng et al. |
| 8,670,214 B1 | 3/2014 | Knutson et al. |
| 8,670,294 B1 | 3/2014 | Shi et al. |
| 8,670,295 B1 | 3/2014 | Hu et al. |
| 8,675,318 B1 | 3/2014 | Ho et al. |
| 8,675,455 B1 | 3/2014 | Krichevsky et al. |
| 8,681,594 B1 | 3/2014 | Shi et al. |
| 8,689,430 B1 | 4/2014 | Chen et al. |
| 8,693,141 B1 | 4/2014 | Elliott et al. |
| 8,703,397 B1 | 4/2014 | Zeng et al. |
| 8,705,205 B1 | 4/2014 | Li et al. |
| 8,711,518 B1 | 4/2014 | Zeng et al. |
| 8,711,528 B1 | 4/2014 | Xiao et al. |
| 8,717,709 B1 | 5/2014 | Shi et al. |
| 8,720,044 B1 | 5/2014 | Tran et al. |
| 8,721,902 B1 | 5/2014 | Wang et al. |
| 8,724,259 B1 | 5/2014 | Liu et al. |
| 8,749,790 B1 | 6/2014 | Tanner et al. |
| 8,749,920 B1 | 6/2014 | Knutson et al. |
| 8,753,903 B1 | 6/2014 | Tanner et al. |
| 8,755,149 B2 | 6/2014 | Song et al. |
| 8,760,807 B1 | 6/2014 | Zhang et al. |
| 8,760,818 B1 | 6/2014 | Diao et al. |
| 8,760,819 B1 | 6/2014 | Liu et al. |
| 8,760,822 B1 | 6/2014 | Li et al. |
| 8,760,823 B1 | 6/2014 | Chen et al. |
| 8,763,235 B1 | 7/2014 | Wang et al. |
| 8,780,498 B1 | 7/2014 | Jiang et al. |
| 8,780,505 B1 | 7/2014 | Xiao |
| 8,786,983 B1 | 7/2014 | Liu et al. |
| 8,790,524 B1 | 7/2014 | Luo et al. |
| 8,790,527 B1 | 7/2014 | Luo et al. |
| 8,792,208 B1 | 7/2014 | Liu et al. |
| 8,792,312 B1 | 7/2014 | Wang et al. |
| 8,793,866 B1 | 8/2014 | Zhang et al. |
| 8,797,680 B1 | 8/2014 | Luo et al. |
| 8,797,684 B1 | 8/2014 | Tran et al. |
| 8,797,686 B1 | 8/2014 | Bai et al. |
| 8,797,692 B1 | 8/2014 | Guo et al. |
| 8,810,964 B2 * | 8/2014 | Gao | G11B 5/1278 360/125.3 |
| 8,813,324 B2 | 8/2014 | Emley et al. |
| 8,817,418 B1 | 8/2014 | Matsuo et al. |

(56) References Cited

U.S. PATENT DOCUMENTS

| | | | |
|---|---|---|---|
| 8,830,626 B2 * | 9/2014 | Heim | G11B 5/3116 360/125.3 |
| 8,842,389 B2 * | 9/2014 | Bai | G11B 5/1278 360/125.3 |
| 8,842,390 B2 | 9/2014 | Shen et al. | |
| 8,848,316 B2 | 9/2014 | Kief et al. | |
| 8,867,168 B2 | 10/2014 | Ota et al. | |
| 9,123,358 B1 * | 9/2015 | Liu | G11B 5/1278 |
| 9,123,886 B2 * | 9/2015 | Zhang | H01L 43/12 |
| 9,196,267 B2 * | 11/2015 | Basu | G11B 5/11 |
| 9,214,165 B1 * | 12/2015 | Liu | G11B 5/6082 |
| 2007/0035885 A1 | 2/2007 | Im et al. | |
| 2007/0268626 A1 | 11/2007 | Taguchi et al. | |
| 2008/0273276 A1 | 11/2008 | Guan | |
| 2009/0154019 A1 | 6/2009 | Hsiao et al. | |
| 2009/0262464 A1 | 10/2009 | Gill et al. | |
| 2010/0033879 A1 | 2/2010 | Ota et al. | |
| 2010/0290157 A1 | 11/2010 | Zhang et al. | |
| 2011/0086240 A1 | 4/2011 | Xiang et al. | |
| 2012/0111826 A1 | 5/2012 | Chen et al. | |
| 2012/0216378 A1 | 8/2012 | Emley et al. | |
| 2012/0237878 A1 | 9/2012 | Zeng et al. | |
| 2012/0298621 A1 | 11/2012 | Gao | |
| 2013/0216702 A1 | 8/2013 | Kaiser et al. | |
| 2013/0216863 A1 | 8/2013 | Li et al. | |
| 2013/0242431 A1 | 9/2013 | Hosomi et al. | |
| 2013/0257421 A1 | 10/2013 | Shang et al. | |
| 2014/0063657 A1 | 3/2014 | Gao et al. | |
| 2014/0098441 A1 | 4/2014 | Saito et al. | |
| 2014/0154529 A1 | 6/2014 | Yang et al. | |
| 2014/0175050 A1 | 6/2014 | Zhang et al. | |
| 2014/0307349 A1 | 10/2014 | Liu et al. | |

FOREIGN PATENT DOCUMENTS

| | | | | |
|---|---|---|---|---|
| JP | 2011014207 A | * | 1/2011 | |
| JP | 2012123894 A | * | 6/2012 | |
| WO | WO 2012036680 A1 | * | 3/2012 | G11B 5/1278 |

OTHER PUBLICATIONS

Feng Liu, et al., U.S. Appl. No. 14/575,090, filed Dec. 18, 2014, 45 pages.

* cited by examiner

MAGNETIC WRITER HAVING A GRADIENT IN SATURATION MAGNETIZATION OF THE SHIELDS AND RETURN POLE

BACKGROUND

FIG. 1 is an air-bearing surface (ABS) view of a conventional magnetic recording transducer 10. The magnetic recording transducer 10 may be a perpendicular magnetic recording (PMR) head. The conventional transducer 10 includes an underlayer 12 that may include a leading shield, side gap 14, side shields 16, top gap 17, a top (or trailing) shield 18, main pole 20, return pole 22 and top pole 24.

The main pole 20 resides on an underlayer/leading shield 12 and includes sidewalls that form a nonzero angle with the down track direction at the ABS. The side shields 16 are separated from the main pole 20 by a side gap 14. The side shields 16 extend at least from the top of the main pole 20 to the bottom of the main pole 20 in the region near the main pole 16. The side shields 16 also extend a distance back from the ABS. The gap 14 between the side shields 16 and the main pole 20 may have a substantially constant thickness. Thus, the side shields 16 are conformal with the main pole 20.

Although the conventional magnetic recording head 10 functions, the conventional magnetic recording head 10 is desired to be used at higher areal densities. Accordingly, what is needed is a system and method for improving the performance of a magnetic recording head at higher areal densities and, therefore, lower track widths.

DETAILED DESCRIPTION OF THE PREFERRED EMBODIMENTS

Figure 1:
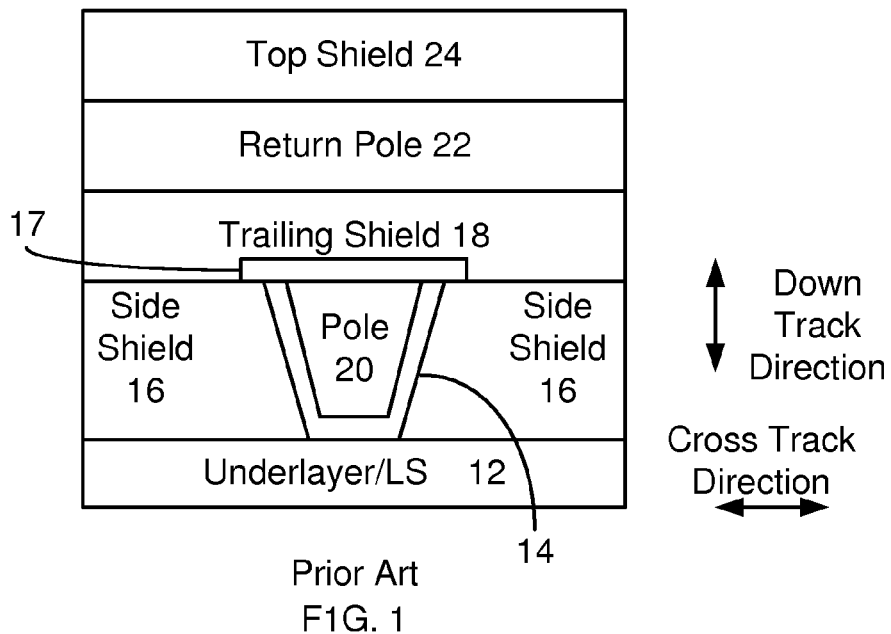
FIG. 1 depicts view of a conventional magnetic recording head.

The trend in magnetic recording is to higher densities. For such higher recording densities, a full wrap around shield may be used. For example, the trailing shield 18, side shields 16 and a leading shield in the underlayer 12 may be used in the transducer 10 depicted in FIG. 1. The trailing shield 18 may have a high saturation magnetization of approximately 2.0 T. The high saturation magnetization may be desired to provide the desired field gradient. The leading shield of the underlayer 12 may have a low saturation magnetization on the order of 1 T. The low saturation magnetization of the leading shield may aid in balancing on and off track performance. The side shield 16 has a higher saturation magnetization of approximately 2.0 T to provide the desired field. The return pole 22 may have an intermediate saturation magnetization of nominally 1.6 T.

Although the low, high and intermediate saturation magnetizations for the leading shield 12, side and trailing shields 16 and 18, and the return pole 22, respectively, may be desirable for some purposes, there may be issues in high density recording. For the configuration described above, it has been determined that the conventional magnetic recording head 10 may suffer from wide area track erasure (WATER) issues. For example, tracks that are tens of tracks away from the track being written may be inadvertently disturbed. It has been determined that this may be due to a mismatch between the saturation magnetizations of the shields 12, 16/18 and the return pole 22. For example, there may be a mismatch in saturation magnetizations between the trailing shield 18 and the return pole 22. Similarly, in regions far from the pole 20, the side shields 16 are removed. Thus, the leading shield 12 shares an interface with the trailing shield 18 in these regions. At these interfaces, the leading shield 12 saturation magnetization does not match that of the trailing shield 18. It has been determined that these mismatches may result in flux leakage at the interfaces. It has been discovered that this flux leakage may result in the above WATER issues. Consequently, it has been determined that there are unaddressed issues in recording at higher areal densities.

Figure 2A:
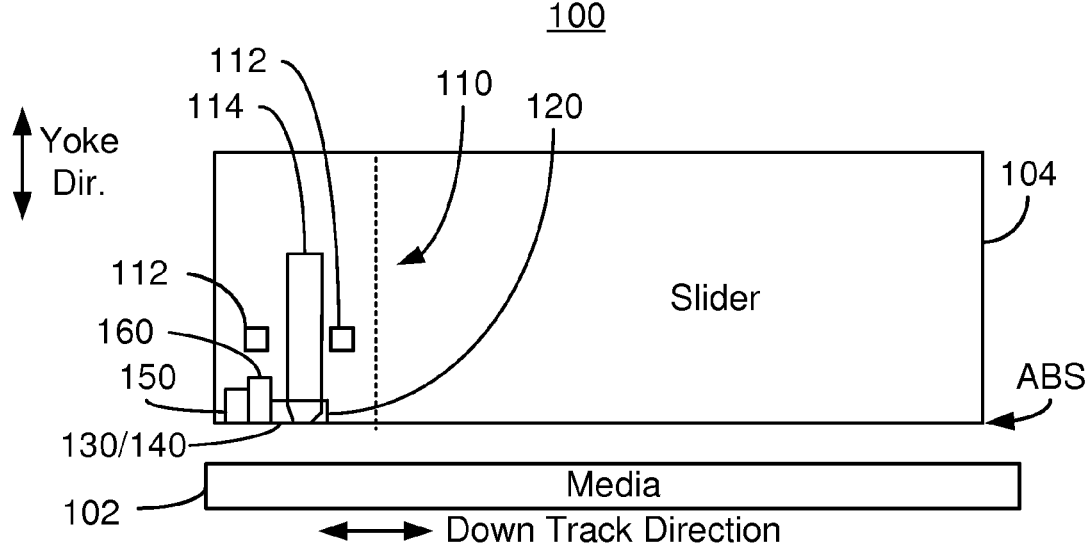
FIGS. 2A, 2B and 2C depict a side view, a close-up ABS view and a graph of saturation magnetization for an exemplary embodiment of a magnetic recording disk drive with shield(s) and/or a return pole having a gradient in saturation magnetization.
Figure 2B:
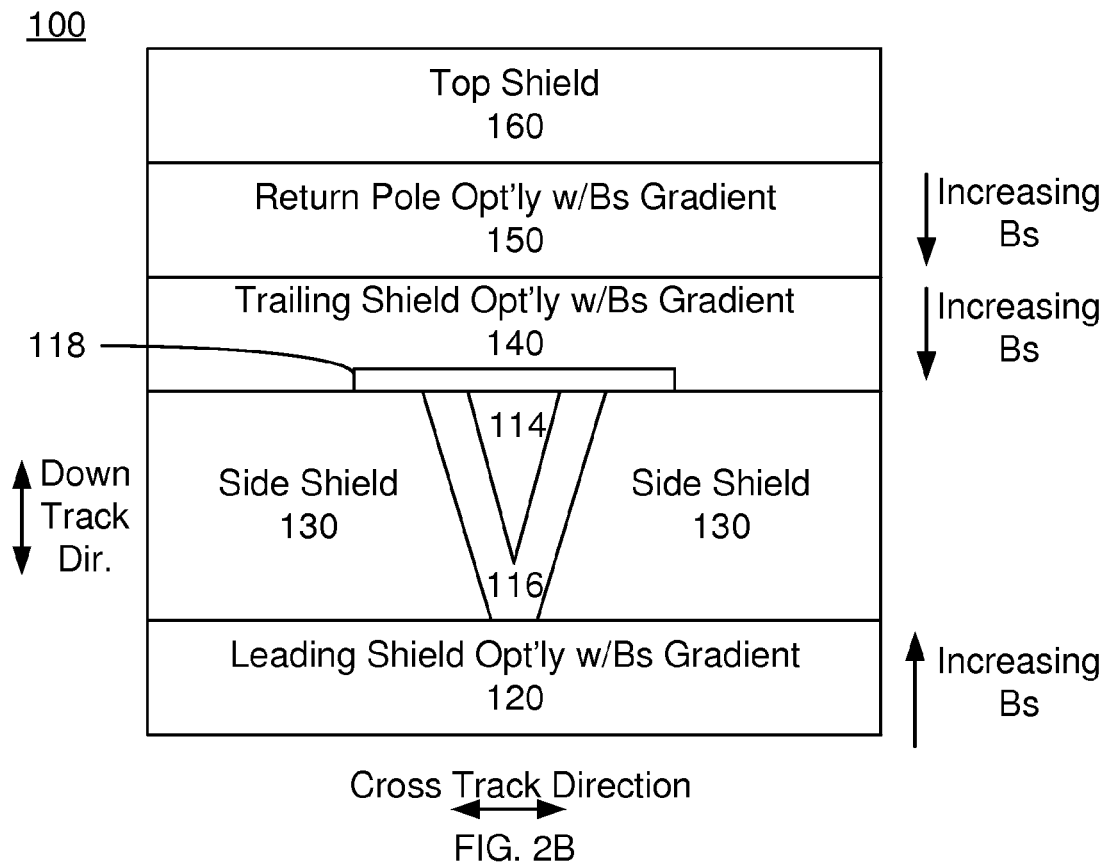
Figure 2C:
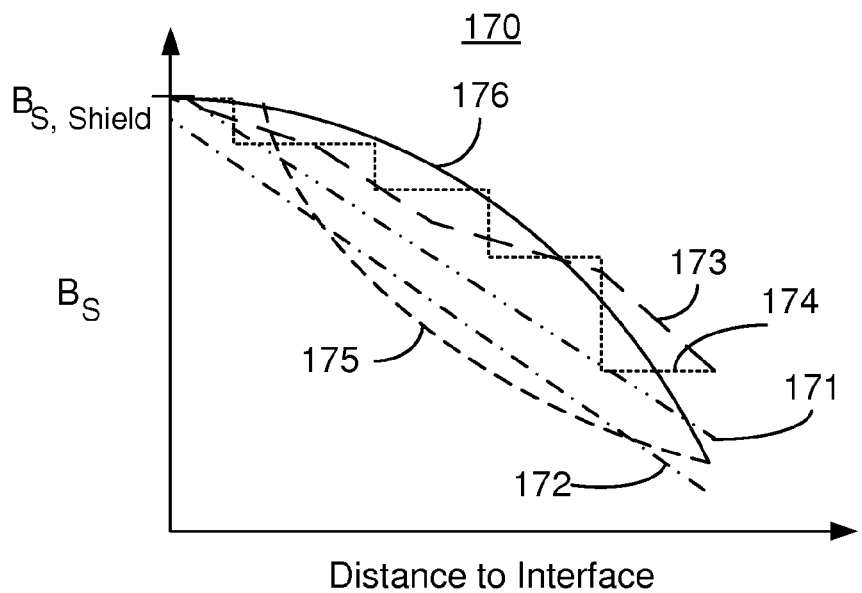

FIGS. 2A, 2B and 2C depict a side view, a close-up ABS view and a graph of saturation magnetization for an exemplary embodiment of a magnetic recording write apparatus, or disk drive, 100 with shield(s) and/or a return pole having a gradient in saturation magnetization. FIG. 2A depicts a side view of the disk drive including a magnetic write transducer 110. For clarity, FIGS. 2A-2B are not to scale. For simplicity not all portions of the disk drive 100 and transducer 110 are shown. In addition, although the disk drive 100 and transducer 110 are depicted in the context of particular components other and/or different components may be used. For example, circuitry used to drive and control various portions of the disk drive is not shown. For simplicity, only single components are shown. However, multiples of each components and/or their sub-components, might be used. The disk drive may be a perpendicular magnetic recording (PMR) disk drive. However, in other embodiments, the disk drive may be configured for other types of magnetic recording included but not limited to heat assisted magnetic recording (HAMR).

The disk drive 100 includes a media 102 and a slider 104 on which the transducer 110 has been fabricated. Although not shown, the slider 104 and thus the transducer 110 are generally attached to a suspension. In general, the slider 104 includes the write transducer 110 and a read transducer (not shown). However, for clarity, only the write transducer 110 is shown.

The transducer 110 includes a main pole 114, a side gap 116 (which also resides below the main pole 114 in the embodiment shown), write gap 118, coil(s) 112, side shields 130, an optional leading shield 120, an optional trailing shield 140, an optional return pole 150 and an optional top shield 160. The coil(s) 112 are used to energize the main pole 114. One turn is depicted in FIG. 2A. Another number of turns may, however, be used. Note that only a portion of the coil(s) 112 may be shown in FIG. 2A. If, for example, the coil(s) 112 is a spiral, or pancake, coil, then additional portions of the coil(s) 112 may be located further from the ABS. Further, additional coils and/or additional layers of coils may also be used.

The main pole 114 is shown as having a top wider than the bottom (which is shown as a point in FIG. 2B). The main pole 114 thus includes sidewalls having sidewall angles that are greater than or equal to zero. In an embodiment, these sidewall angles differ at different distances from the ABS. In other embodiments, other geometries may be used. For example, the top may be the same size as or smaller than the bottom. The sidewall angles may also vary in another manner. The main pole 114 is depicted as having a triangular shape. In other embodiments, the main pole 114 may have another shape. For example, the main pole 114 might be trapezoidal, having a flat bottom that is less wide than the top. In some embodiments, the main pole 114 may have leading surface bevel and/or a trailing surface bevel. Thus, the main pole 114 may be shorter in the down track direction at the ABS than at location(s) recessed from the ABS.

The gap layer 116 may include one or more sublayers as well as a seed layer. Further, although depicted as a single gap surrounding the main pole 114, the gap 116 may include separate side gaps (between the mail pole 114 and side shields 130) and bottom gap (between the main pole 114 and leading shield 120). In addition, the write gap 118 and side gap 116 may be a single structure. However, in such embodiments, the write gap 118 generally does not extend further in the cross track direction than the side gap 116. Although depicted as symmetric, the gap 116 may be asymmetric. For example, the gap between a side of the main pole 114 and one side shield 130 may be wider than the gap between the opposite side of the main pole 114 and the other side shield.

The transducer 100 also includes side shields 130. The side shields 130 may be magnetically and, in some embodiments, physically connected with the trailing shield 140 and leading shield 120. In such embodiments, a full wraparound shield is formed. In other embodiments, the side shields 130 may be physically and/or magnetically disconnected from the trailing shield 140 and/or the leading shield 120. The side shields 130 are also depicted as symmetric in the cross track direction. In other embodiments, asymmetries in the cross track direction may be present. In general, the side shields 130 have a high saturation magnetization. For example, in some embodiments, the side shields 130 have a saturation magnetization of at least 2.0 T. In the embodiment shown, the saturation magnetization of the side shields 130 is substantially constant throughout the side shields 130. However, a gradient in the down track direction, cross track direction and/or yoke direction may be possible.

At least one of the leading shield 120, the trailing shield 140 and the return pole 150 has a gradient in saturation magnetization (Bs) in at least a portion of the structure 120, 140 and 150, respectively. This gradient is configured such that the saturation magnetization of at least part of the structure 120, 140 and/or 150 changes in the down track direction so that the mismatch in saturation magnetization at various interfaces with other structures 130, and/or 140 may be reduced or eliminated. In some embodiments, this gradient in saturation magnetization is such that $B_s$ increases in the down track direction toward the main pole 114 and/or side shields 130. In some embodiments, the saturation magnetizations match at the interfaces. For example, the leading shield 120 saturation magnetization may increase toward the side shield 130 such that at the interface shared by the side shields 130 and leading shield 120 the saturation magnetizations match. In some embodiments, the saturation magnetization of the trailing shield increases toward the side shields 130 such that the saturation magnetization of the trailing shield 140 matches that of the side shield 130 at the interface shared by the shields 130 and 140. The saturation magnetization of the trailing shield 140 may also decrease toward the return pole such that the saturation magnetization of the trailing shield 140 matches that of the return pole 150 at the interface shared by the shield 140 and return pole 150. In some embodiments, the saturation magnetization of the return pole 150 increases toward the side shields 130 such that the saturation magnetization of the return pole 150 matches that of the trailing shield 140 at the interface shared by the return pole 150 and trailing shield 140. In other embodiments, the gradient in saturation magnetization of the structure(s) 120, 140 and/or 150 increases such that the mismatch in saturation magnetizations is less at the interfaces without exactly matching. For example, the highest saturation magnetization of the leading shield 120 may occur at the surface closest to/interface with the side shields 130 even though the saturation magnetization of the leading shield 120 may be less than that of the side shield 130 at this surface/interface. Similarly, the highest saturation magnetization of the trailing shield 140 may occur at the surface closest to/interface shared with the side shields 130 even though the saturation magnetization of the trailing shield 140 may be less than that of the side shield 130 at this surface/interface. Finally, the highest saturation magnetization of the return pole 150 may occur at the surface closest to/interface with the trailing shields 140 even though the saturation magnetization of the return pole 150 may be less than that of the trailing shield 140 at this interface/surface. In some embodiments, only one of the leading shield 120, trailing shield 140 and return pole 150 has a gradient in the saturation magnetization. In other embodiments, some combination of the leading shield 120, trailing shield 140 and return pole 150 has a gradient in saturation magnetization. For example, both the leading shield 120 and the trailing shield 140 may have a gradient in saturation magnetization in the down track direction. Alternatively, both the leading shield 120 and the return pole 150 may have a gradient in the saturation magnetization in the down track direction. Further, note that the saturation magnetizations of the structures 120, 130, 140 and 150 are not equal throughout the structures 120, 130, 140 and 150. If the saturation magnetizations of the shields 120, 130 and 140 are all the same, then signal-to-noise-ratio, reverse overwrite and/or other relevant performance measures may suffer. In general, the leading shield 120 is desired to have the lowest saturation magnetization. The trailing shield 130 and/or side shields 130 are generally desired to include the highest saturation magnetization. The return pole 150 is generally desired to have an intermediate saturation magnetization. Thus, although one or more of the structures 120, 130 and 150 have a gradient in saturation magnetization a significant portion of the structures 120, 130 and 150 are desired to have a low saturation magnetization, a high saturation magnetization and an intermediate saturation magnetization, respectively.

In some embodiments, the saturation magnetization(s) decrease monotonically within a portion of the structure 120, 140 and/or 150 as distance from the side shields 130 increases. In other words, the $B_s$ decreases, without any increases, with distance from the side shield(s) 130 in the down track direction. The decrease in saturation magnetization may be linear, step-wise, or described in another manner. In other embodiments, the decrease in saturation magnetization need not be monotonic and/or need not be described by a well-known function. For example, FIG. 2C is a graph 170 depicting various curves 171, 172, 173, 174, 175 and 176 indicating some ways in which the saturation magnetization of at least a portion of the structure(s) 120, 140 and/or 150 changes with increasing distance to the relevant interface. For example, dashed lines 171 and 172 indicate that the saturation magnetizations may decrease linearly (though with different slopes) with increasing distance from the interface closest to the side shield(s) 130. This may occur if the composition of at least part of the leading shield 120, trailing shield 140 and/or return pole 150 is varied continuously. Dashed line 173 indicates a piecewise linear decrease with increasing distance from the interface of the structure that is closest to the side shield(s) 130. This may occur where there are multiple layers, each of which has a varying composition. Dotted line 174 indicates a stepped decrease in saturation magnetization with increase distance of the structure 120/140/150 from the interface closest to the side shield(s) 130. This may occur for a multilayer structure 120/140/150 in which each layer has a substantially constant saturation magnetization. Curves 175 and 176 indicate that the change in saturation magnetization may not be linear. Thus, the gradient in saturation magnetization may be achieved in a number of ways. In some embodiments, the concentration of various constituents in the alloy(s) leading shield 120, trailing shield 140 and/or return pole 150 may be varied. In other embodiments, regions of different materials may be used. For example, a layer closest side shields 130 may be an alloy having one saturation magnetization. The next layer in the down track direction further from the side shields 130 may be a different alloy having a lower $B_s$, and so on.

For example, the side shields 130 may have a saturation magnetization of nominally 2.0 T and that the return pole 150 may have a saturation magnetization of nominally 1.6 T. In some such embodiments, the leading shield 120 saturation magnetization may increase from 1.0 T in a region furthest from the side shields 130 in the down track direction to as much as 2.0 T at the interface with the side shields 130. For example, the leading shield 120 may include, from furthest to closest to the side shields 130, a layer having a 1.0 T $B_s$, a layer having a 1.6 T $B_s$, a layer having a 1.8 T $B_s$, and a layer having a 2.0 T $B_s$. In some cases, the 2.0 T $B_s$ layer may be omitted or partially/fully removed during processing. Further, the layer having the lowest saturation magnetization may be thickest for the leading shield 120. In some embodiments, the trailing shield 140 may include, from furthest to closest to the side shields 130, a layer having a 1.6 T $B_s$, a layer having a 1.8 T $B_s$ and a layer having a 2.0 T $B_s$. The 1.6 T $B_s$ layer for the trailing shield 140 may be omitted or removed during processing. The 2.0 T $B_s$ layer may be desired to be thickest. In other embodiments, both the side shields 130 and the trailing shield 140 may have saturation magnetizations of nominally 2.0 T. In such embodiments, the leading shield 120 may be configured as described above. However, the return pole 150 may include, from furthest to closest to the trailing shield 140/side shields 130, a layer having a 1.6 T $B_s$, a layer having a 1.8 T $B_s$ and an optional layer having a 2.0 T $B_s$. The layer having a 1.6 T $B_s$ may be thickest for the return pole 150. Thus, the interfaces between the structures 120 and 130, 130 and 140, and 140 and 150 may have a reduced saturation magnetization mismatch.

Performance of the transducer 110 and disk drive 100 may be improved by the structures 120, 140 and/or 150 having a gradient in the saturation magnetization. As mentioned above, the mismatch in the saturation magnetizations between the structures 120, 130, 140 and/or 150 may be reduced. Stated differently sharp transitions in the magnetic properties of the transducer 110 at the interfaces between the structures 120, 130, 140 and/or 150 may be reduced or eliminated. This may assist in addressing WATER and other issues. If the bulk of the structures 120, 140 and 150 remain with the low, high and intermediate saturation magnetization, other properties of the transducer 110 may be preserved. Thus, performance of the transducer 100 may be improved.

Figure 3:
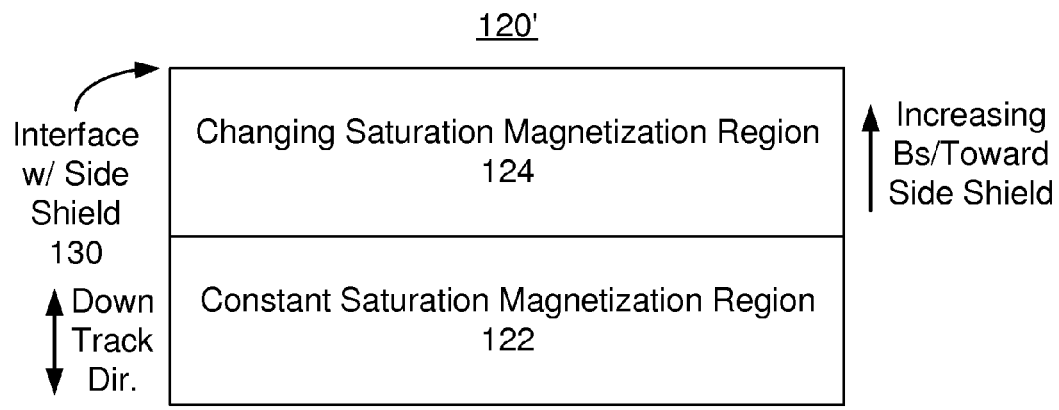
FIG. 3 is an ABS view of an exemplary embodiment of a portion of a leading shield having a gradient in saturation magnetization.

FIG. 3 is an ABS view of an exemplary embodiment of a portion of a leading shield 120' having a gradient in saturation magnetization. For clarity, FIG. 3 is not to scale. The leading shield 120' may be part of the transducer 110/disk drive 100. Thus, the leading shield 120' is analogous to the leading shield 120. For simplicity not all portions of the leading shield 120' are shown. In addition, although the leading shield 120' is depicted in the context of particular layers other and/or different layers may be used. For example, other materials having other saturation magnetizations may be used. In addition, in some embodiments, the saturation magnetization may also have a gradient in the yoke direction. Because the leading shield 120' is analogous to the leading shield 120, similar components have similar labels.

The leading shield 120' includes an optional constant saturation magnetization region 122 and a changing saturation magnetization region 124. The constant saturation magnetization region 122 may be a layer that has a saturation magnetization that is substantially constant in the down track direction. For example, the constant saturation magnetization region 122 may be a soft magnetic layer having a saturation magnetization of 1.0 T. In some embodiments, the region 122 occupies approximately at least half of the leading shield 120'. For example, if the shield 120' has a total thickness of 0.65 µm, then the constant saturation magnetization region 122 may be desired to have a thickness of approximately 0.3 µm. In other embodiments, other thicknesses for the region 122 are possible. The final thicknesses of the regions may depend upon the ability to reliably fabricate the layers. The leading shield 120' also includes a changing saturation magnetization region 124. In this region 124, the saturation magnetization increases toward the interface with the side shield 130. For example, the region 124 may be a multilayer or may have a gradient in concentration such that the saturation magnetization increases in the down track direction, toward the side shields 130. In some embodiments, the saturation magnetization of the region 124 matches that of the side shield 130 at the interface. However, in other embodiments, at the interface with the side shields 130, the saturation magnetization of the region 124 is less than that of the side shields 130 and more than that of the region 122. There is no requirement that the saturation magnetizations of the regions 122 and 124 match at their shared interface. However, such a configuration is possible.

Performance of the transducer 110 and disk drive 100 may be improved by the leading shield 120'. The region 124 of the leading shield 120' has a higher saturation magnetization that more closely matches the side shield saturation magnetization. The mismatch in magnetic properties between the shields 120' and 130 may be reduced. The leading shield 120' also still has a significant portion 122 having a lower saturation magnetization. These features may help address WATER and other issues. Thus, performance of the transducer 110 may be improved.

Figure 4:
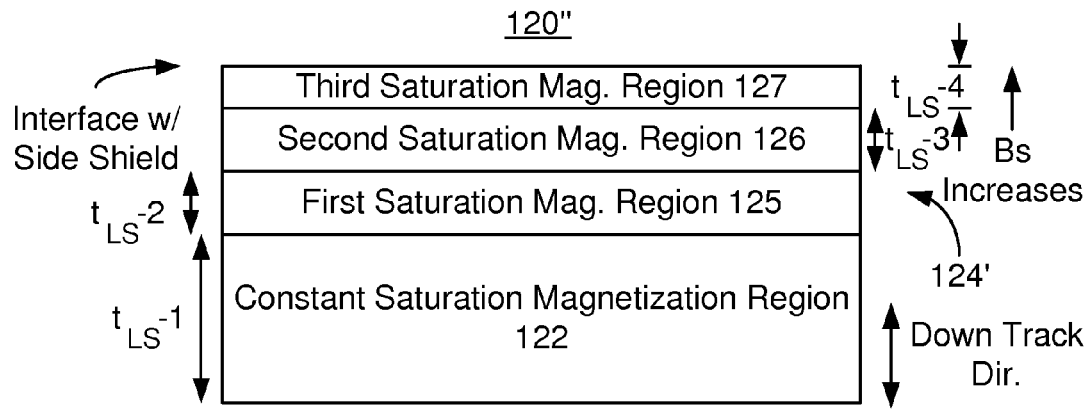
FIG. 4 is an ABS view of another exemplary embodiment of a portion of a leading shield having a gradient in saturation magnetization.

FIG. 4 is an ABS view of an exemplary embodiment of a portion of a leading shield 120" having a gradient in saturation magnetization. For clarity, FIG. 4 is not to scale. The leading shield 120" may be part of the transducer 110/disk drive 100. Thus, the leading shield 120" is analogous to the leading shield 120 and/or 120'. For simplicity not all portions of the leading shield 120" are shown. In addition, although the leading shield 120" is depicted in the context of particular layers other and/or different layers may be used. For example, other materials having other saturation magnetizations may be used. In addition, in some embodiments, the saturation magnetization may also have a gradient in the yoke direction. Because the leading shield 120" is analogous to the leading shield 120/120', similar components have similar labels.

The leading shield 120" includes an optional constant saturation magnetization region 122 and a changing saturation magnetization region 124' that are analogous to the regions 122 and 124, respectively. In some embodiments, the region 122 is the thickest of the regions 122, 125, 126 and 127. In some such embodiments, the region 122 occupies approximately at least half of the leading shield 120". In other embodiments, other thicknesses for the region 122 are possible. The final thicknesses of the regions may depend upon the ability to reliably fabricate the layers.

The leading shield 120" also includes a changing saturation magnetization region 124' that includes three layers 125, 126 and 127. Another number of layers may be possible. The $B_s$ of each of the layers 125, 126 and 127 may be constant or varying in the down track direction. In region 124', the saturation magnetization increases toward the interface with the side shield 130. The $B_s$ of the first region 125 is lower than the $B_s$ of the second region 126. Similarly, the $B_s$ of the second region 126 is less than the $B_s$ of the third region 127. In the embodiment shown, the regions 122, 125, 126 and 127 have thicknesses $t_{LS}$-1, $t_{LS}$-2, $t_{LS}$-3 and $t_{LS}$-4, respectively. In the embodiment shown, $t_{LS}$-1 is the largest. The thicknesses of the regions 125, 126 and 127 may be the same or may differ. In the embodiment shown, the third region 127 is thinnest. This may be because the layer 127 had a smaller thickness as-deposited and/or because part of the layer 127 is removed by a planarization or other fabrication step. In some cases, the layer 127 might be completely removed. In such embodiments, the layers 125 and 126 are present in the final device.

Performance of the transducer 110 and disk drive 100 may be improved by the leading shield 120". The region 124' of the leading shield 120" has a higher saturation magnetization that more closely matches the side shield saturation magnetization. The mismatch in magnetic properties between the shields 120" and 130 may be reduced. The leading shield 120" also still has a significant portion 122 having a lower saturation magnetization. These features may help address WATER and other issues. Thus, performance of the transducer 110 may be improved.

Figure 5:
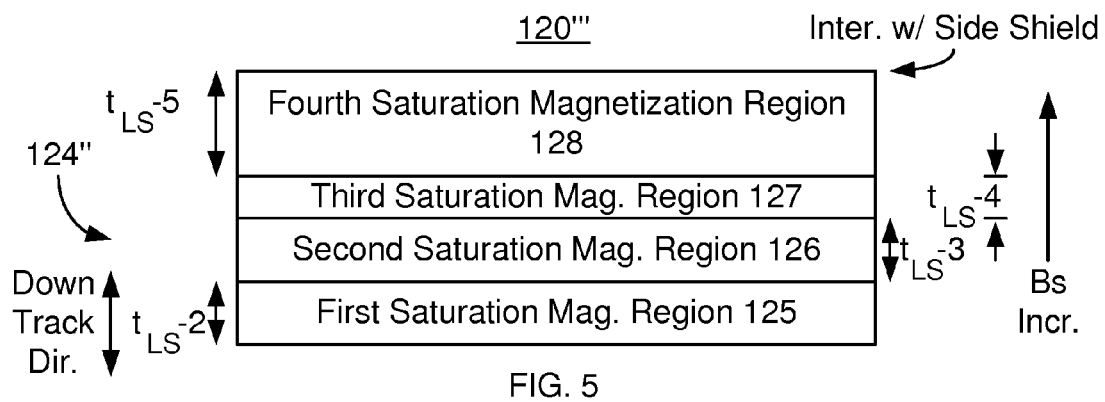
FIG. 5 is an ABS view of another exemplary embodiment of a portion of a leading shield having a gradient in saturation magnetization.

FIG. 5 is an ABS view of an exemplary embodiment of a portion of a leading shield 120''' having a gradient in saturation magnetization. For clarity, FIG. 5 is not to scale. The leading shield 120''' may be part of the transducer 110/disk drive 100. Thus, the leading shield 120''' is analogous to the leading shield 120, 120' and/or 120". For simplicity not all portions of the leading shield 120''' are shown. In addition, although the leading shield 120''' is depicted in the context of particular layers other and/or different layers may be used. For example, other materials having other saturation magnetizations may be used. In addition, in some embodiments, the saturation magnetization may also have a gradient in the yoke direction. Because the leading shield 120''' is analogous to the leading shield 120/120'/120", similar components have similar labels.

The leading shield 120''' includes a changing saturation magnetization region 124" that is analogous to the regions 124/124'. In this embodiment, no constant saturation magnetization region 122 is present. The changing saturation magnetization region 124" that includes four layers 125, 126, 127 and 128. Another number of layers may be possible. The $B_s$ of each of the layers 125, 126, 127 and 128 may be constant or varying in the down track direction. In region 124", the saturation magnetization increases toward the interface with the side shield 130. The $B_s$ of the first region 125 is lower than the $B_s$ of the second region 126. Similarly, the $B_s$ of the second region 126 is less than the $B_s$ of the third region 127. Further, the $B_s$ of the third region 127 is less than the $B_s$ of the fourth region 128. In the embodiment shown, the regions 125, 126, 127 and 128 have thicknesses $t_{LS}$-2, $t_{LS}$-3, $t_{LS}$-4 and $t_{LS}$-5, respectively. The thicknesses of the regions 125, 126, 127 and 128 may be the same or may differ. The final thicknesses of the regions may depend upon the ability to reliably fabricate the layers. In a manner analogous to the shield 120" although the top layer 128 is shown, this layer 128 may be partially or completely removed during fabrication. In such embodiments, the layers 125, 126 and 127 are present in the final device. In other embodiments, all or some of the layer 128 is present in the final device.

Performance of the transducer 110 and disk drive 100 may be improved by the leading shield 120'''. The region 124" of the leading shield 120''' has a higher saturation magnetization that more closely matches the side shield saturation magnetization. The mismatch in magnetic properties between the shields 120''' and 130 may be reduced. This may help address WATER and other issues. Thus, performance of the transducer 110 may be improved.

Figure 6:
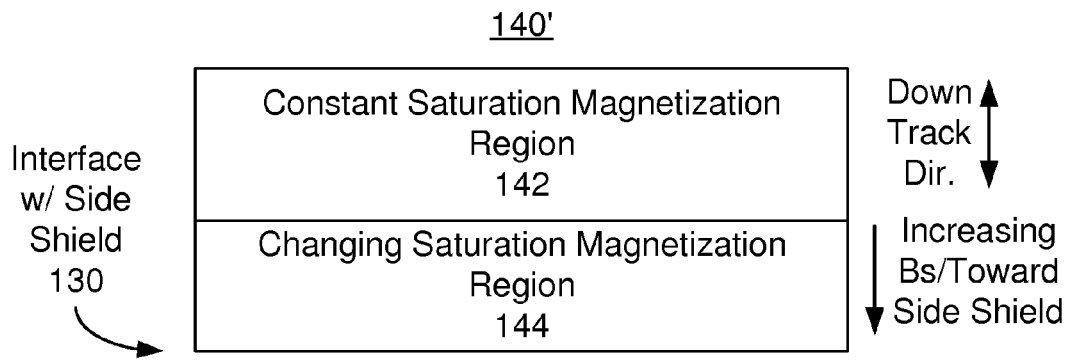
FIG. 6 is an ABS view of an exemplary embodiment of a portion of a trailing shield having a gradient in saturation magnetization.

FIG. 6 is an ABS view of an exemplary embodiment of a portion of a trailing shield 140' having a gradient in saturation magnetization. For clarity, FIG. 4 is not to scale. The trailing shield 140' may be part of the transducer 110/disk drive 100. Thus, the trailing shield 140' is analogous to the trailing shield 140. For simplicity not all portions of the trailing shield 140' are shown. In addition, although the trailing shield 140' is depicted in the context of particular layers other and/or different layers may be used. For example, other materials having other saturation magnetizations may be used. In addition, in some embodiments, the saturation magnetization may also have a gradient in the yoke direction. Because the trailing shield 140' is analogous to the trailing shield 140, similar components have similar labels.

The trailing shield 140' includes an optional constant saturation magnetization region 142 and a changing saturation magnetization region 144. The constant saturation magnetization region 142 may be a layer that has a saturation magnetization that is substantially constant in the down track direction. For example, the constant saturation magnetization region 142 may be a soft magnetic layer having a saturation magnetization of 1.6 T. In some embodiments, the region 142 occupies approximately at least half of the trailing shield 140'. For example, for a trailing shield over 1.5 µm thick, the region 142 may be over 1 µm thick. In other embodiments, other thicknesses for the region 142 are possible. The final thicknesses of the regions may depend upon the ability to reliably fabricate the layers. The trailing shield 140' also includes a changing saturation magnetization region 144. In this region 144, the saturation magnetization increases toward the interface with the side shield 130. For example, the region 144 may be a multilayer or may have a gradient in concentration such that the saturation magnetization increases in the down track direction, toward the side shields 130. In some embodiments, the saturation magnetization of the region 144 matches that of the side shield 130 at the interface. However, in other embodiments, at the interface with the side shields 130, the saturation magnetization of the region 144 is less than that of the side shields 130 and more than that of the region 142. There is no requirement that the saturation magnetizations of the regions 142 and 144 match at their shared interface. However, such a configuration is possible.

Performance of the transducer 110 and disk drive 100 may be improved by the trailing shield 140'. The region 144 of the trailing shield 140' has a higher saturation magnetization that more closely matches the side shield saturation magnetization. The mismatch in magnetic properties between the shields 140' and 130 may be reduced. The trailing shield 140' also still has a portion 142 having a lower saturation magnetization that may match that of the return pole 150. These features may help address WATER and other issues. Thus, performance of the transducer 110 may be improved.

Figure 7:
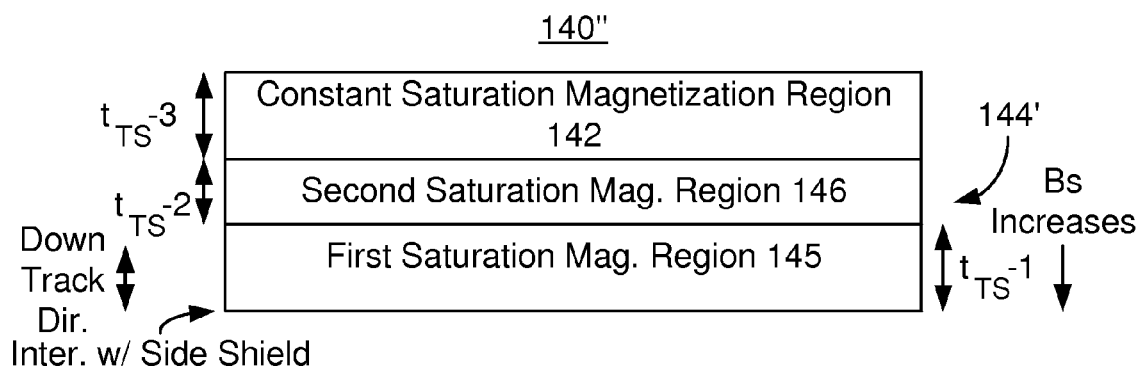
FIG. 7 is an ABS view of another exemplary embodiment of a portion of a trailing shield having a gradient in saturation magnetization.

FIG. 7 is an ABS view of an exemplary embodiment of a portion of a trailing shield 140" having a gradient in saturation magnetization. For clarity, FIG. 7 is not to scale. The trailing shield 140" may be part of the transducer 110/disk drive 100. Thus, the trailing shield 140" is analogous to the trailing shield 140 and/or 140'. For simplicity not all portions of the trailing shield 140" are shown. In addition, although trailing shield 140" is depicted in the context of particular layers other and/or different layers may be used. For example, other materials having other saturation magnetizations may be used. In addition, in some embodiments, the saturation magnetization may also have a gradient in the yoke direction. Because the trailing shield 140" is analogous to the trailing shield 140/140', similar components have similar labels.

The trailing shield 140" includes an optional constant saturation magnetization region 142 and a changing saturation magnetization region 144' that are analogous to the regions 142 and 144, respectively. In some embodiments, the region 142 is the thickest of the regions 142, 145 and 146. In some such embodiments, the region 142 occupies approximately at least half of the trailing shield 140". In other embodiments, other thicknesses for the region 142 are possible. Further, some or all of the region 142 may be removed during processing, for example in a planarization step. Thus, although deposited with a higher thickness, the region 142 may be thinner than the region 145 and/or 146 in the final device. The final thicknesses of the regions may depend upon the ability to reliably fabricate the layers.

The trailing shield 140" also includes a changing saturation magnetization region 144' that includes two layers 145 and 146. Another number of layers may be possible. The $B_s$ of each of the layers 155 and 156 may be constant or varying in the down track direction. In region 144', the saturation magnetization increases toward the interface with the side shield 130. The $B_s$ of the first region 145 is higher than the $B_s$ of the second region 146. In the embodiment shown, the regions 145, 146 and 142 have thicknesses $t_{TS}$-1, $t_{TS}$-2 and $t_{TS}$-3, respectively. In the embodiment shown, $t_{TS}$-3 is the largest. The thicknesses of the regions 145 and 146 may be the same or may differ.

Performance of the transducer 110 and disk drive 100 may be improved by the trailing shield 140". The region 144' of the trailing shield 140" has a higher saturation magnetization that more closely matches the side shield saturation magnetization. The mismatch in magnetic properties between the shields 140" and 130 may be reduced. The trailing shield 140" may also still have a portion 142 having an intermediate saturation magnetization that matches that of the return pole 150. These features may help address WATER and other issues. Thus, performance of the transducer 110 may be improved.

Figure 8:
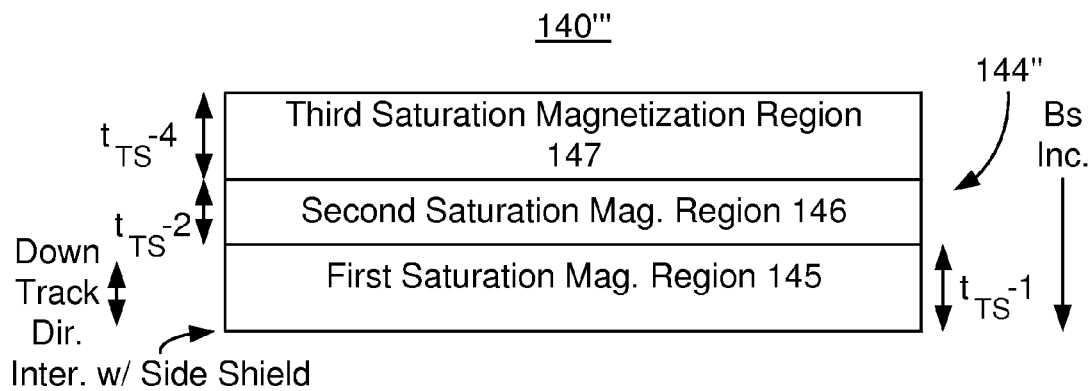
FIG. 8 is an ABS view of another exemplary embodiment of a portion of a trailing shield having a gradient in saturation magnetization.

FIG. 8 is an ABS view of an exemplary embodiment of a portion of a trailing shield 140''' having a gradient in saturation magnetization. For clarity, FIG. 8 is not to scale. The trailing shield 140''' may be part of the transducer 110/disk drive 100. Thus, the trailing shield 140''' is analogous to the trailing shield 140, 140' and/or 140". For simplicity not all portions of the trailing shield 140''' are shown. In addition, although trailing shield 140''' is depicted in the context of particular layers other and/or different layers may be used. For example, other materials having other saturation magnetizations may be used. In addition, in some embodiments, the saturation magnetization may also have a gradient in the yoke direction. Because the trailing shield 140''' is analogous to the trailing shield 140/140'/140", similar components have similar labels.

The trailing shield 140''' includes a changing saturation magnetization region 144" that is analogous to the regions 144/144'. In this embodiment, no constant saturation magnetization region 142 is present. The changing saturation magnetization region 144" that includes three layers 145, 146 and 147. Another number of layers may be possible. The $B_s$ of each of the layers 145, 146 and 147 may be constant or varying in the down track direction. In region 144", the saturation magnetization increases toward the interface with the side shield 130. The $B_s$ of the first region 145 is higher than the $B_s$ of the second region 146. Similarly, the $B_s$ of the second region 146 is greater than the $B_s$ of the third region 147. In the embodiment shown, the regions 145, 146 and 147 have thicknesses $t_{TS}$-1, $t_{TS}$-2 and $t_{TS}$-4, respectively. The thicknesses of the regions 145, 146 and 147 may be the same or may differ. The final thicknesses of the regions may depend upon the ability to reliably fabricate the layers. In a manner analogous to the shield 140" although the top layer 147 is shown, this layer 147 may be partially or completely removed during fabrication. In such embodiments, the layers 145 and 146 are present in the final device. In other embodiments, all or some of the layer 147 is present in the final device.

Performance of the transducer 110 and disk drive 100 may be improved by the trailing shield 140'''. The region 144'' of the trailing shield 140''' has a higher saturation magnetization that more closely matches the side shield saturation magnetization. The mismatch in magnetic properties between the shields 140''' and 130 may be reduced. This may help address WATER and other issues. Thus, performance of the transducer 110 may be improved.

Figure 9:
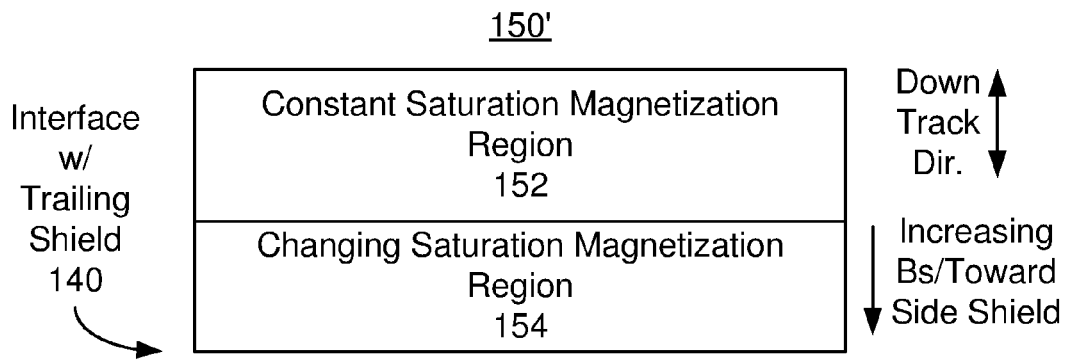
FIG. 9 is an ABS view of an exemplary embodiment of a portion of a return pole having a gradient in saturation magnetization.

FIG. 9 is an ABS view of an exemplary embodiment of a portion of a return pole 150' having a gradient in saturation magnetization. For clarity, FIG. 9 is not to scale. The return pole 150' may be part of the transducer 110/disk drive 100. Thus, the return pole 150' is analogous to the return pole 150. For simplicity not all portions of the return pole 150' are shown. In addition, although the return pole 150' is depicted in the context of particular layers other and/or different layers may be used. For example, other materials having other saturation magnetizations may be used. In addition, in some embodiments, the saturation magnetization may also have a gradient in the yoke direction. Because the return pole 150' is analogous to the return pole 150, similar components have similar labels.

The return pole 150' includes an optional constant saturation magnetization region 152 and a changing saturation magnetization region 154. The constant saturation magnetization region 152 may be a layer that has a saturation magnetization that is substantially constant in the down track direction. For example, the constant saturation magnetization region 152 may be a soft magnetic layer having a saturation magnetization of 1.6 T. In some embodiments, the region 152 occupies approximately at least half of the return pole 150'. In other embodiments, other thicknesses for the region 152 are possible. The final thicknesses of the regions may depend upon the ability to reliably fabricate the layers. The return pole 150' also includes a changing saturation magnetization region 154. In this region 154, the saturation magnetization increases toward the interface with the trailing shield 140. For example, the region 154 may be a multilayer or may have a gradient in concentration such that the saturation magnetization increases in the down track direction, toward the trailing shield 140. In some embodiments, the saturation magnetization of the region 154 matches that of the trailing shield 140 at the interface. However, in other embodiments, at the interface with the trailing shield 140, the saturation magnetization of the region 154 is less than that of the trailing shield 140 and more than that of the region 152. There is no requirement that the saturation magnetizations of the regions 152 and 154 match at their shared interface. However, such a configuration is possible.

Performance of the transducer 110 and disk drive 100 may be improved by the return pole 150'. The region 154 of the return pole 150' has a higher saturation magnetization that more closely matches the trailing shield saturation magnetization. The mismatch in magnetic properties between the return pole 150' and the trailing shield 140 may be reduced. The return pole 150' also still has a portion 152 having a lower/intermediate saturation magnetization that may be desired for other reasons. These features may help address WATER and other issues. Thus, performance of the transducer 110 may be improved.

Figure 10:
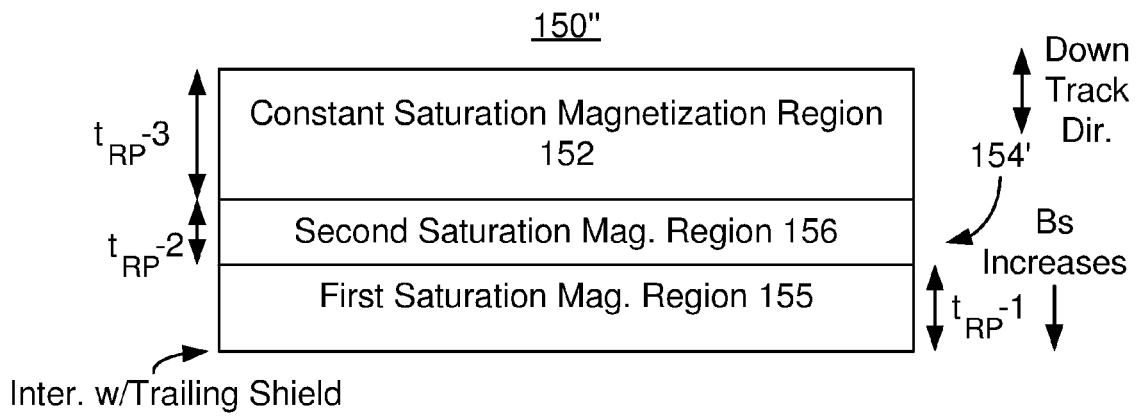
FIG. 10 is an ABS view of another exemplary embodiment of a portion of a trailing shield having a gradient in saturation magnetization.

FIG. 10 is an ABS view of an exemplary embodiment of a portion of a return pole 150'' having a gradient in saturation magnetization. For clarity, FIG. 10 is not to scale. The return pole 150'' may be part of the transducer 110/disk drive 100. Thus, the return pole 150'' is analogous to the return pole 150 and/or 150'. For simplicity not all portions of the return pole 150'' are shown. In addition, although return pole 150'' is depicted in the context of particular layers other and/or different layers may be used. For example, other materials having other saturation magnetizations may be used. In addition, in some embodiments, the saturation magnetization may also have a gradient in the yoke direction. Because the return pole 150'' is analogous to the return pole 150/150', similar components have similar labels.

The return pole 150'' includes an optional constant saturation magnetization region 152 and a changing saturation magnetization region 154' that are analogous to the regions 152 and 154, respectively. In some embodiments, the region 152 is the thickest of the regions 152, 155 and 156. In some such embodiments, the region 152 occupies approximately at least half of the return pole 150''. In other embodiments, other thicknesses for the region 152 are possible. Further, some or all of the region 152 may be removed during processing, for example in a planarization step. Thus, although deposited with a higher thickness, the region 152 may be thinner than the region 155 and/or 156 in the final device.

The return pole 150'' also includes a changing saturation magnetization region 154' that includes two layers 155 and 156. Another number of layers may be possible. The $B_s$ of each of the layers 155 and 156 may be constant or varying in the down track direction. In region 154', the saturation magnetization increases toward the interface with the trailing shield 140. The $B_s$ of the first region 155 is higher than the $B_s$ of the second region 156. In the embodiment shown, the regions 1545, 156 and 152 have thicknesses $t_{RP}$-1, $t_{RP}$-2 and $t_{RP}$-3, respectively. In the embodiment shown, $t_{RP}$-3 is the largest. The thicknesses of the regions 155 and 156 may be the same or may differ. The final thicknesses of the regions may depend upon the ability to reliably fabricate the layers.

Performance of the transducer 110 and disk drive 100 may be improved by the return pole 150''. The region 154' of the return pole 150'' has a higher saturation magnetization that more closely matches the side shield saturation magnetization. The mismatch in magnetic properties between the shield 140 and return pole 150'' may be reduced. The return pole 150'' may also still have a portion 152 having an intermediate saturation magnetization that may be desired for the return pole 150 for other reasons. These features may help address WATER and other issues. Thus, performance of the transducer 110 may be improved.

Figure 11:
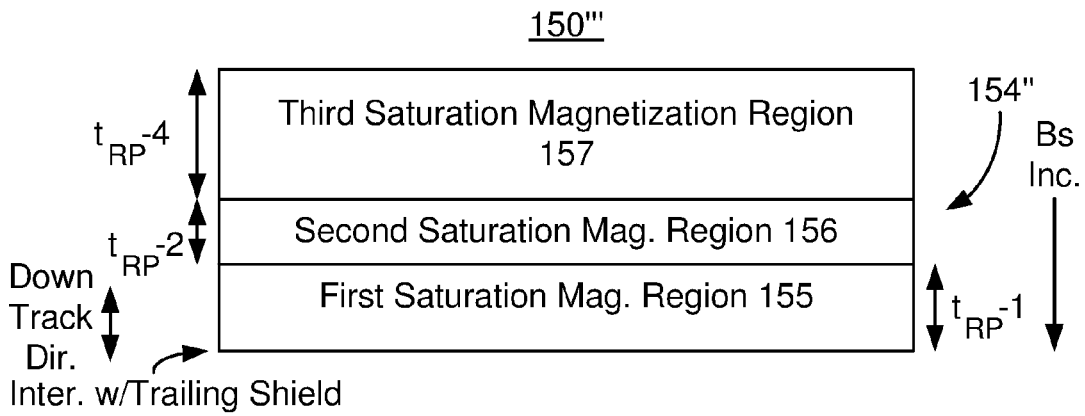
FIG. 11 is an ABS view of another exemplary embodiment of a portion of a return pole having a gradient in saturation magnetization.

FIG. 11 is an ABS view of an exemplary embodiment of a portion of a return pole 150''' having a gradient in saturation magnetization. For clarity, FIG. 11 is not to scale. The return pole 150''' may be part of the transducer 110/disk drive 100. Thus, the return pole 150''' is analogous to the return pole 150, 150' and/or 150''. For simplicity not all portions of the return pole 150''' are shown. In addition, although return pole 150''' is depicted in the context of particular layers other and/or different layers may be used. For example, other materials having other saturation magnetizations may be used. In addition, in some embodiments, the saturation magnetization may also have a gradient in the yoke direction. Because the return pole 150''' is analogous to the return pole 150/150'/150'', similar components have similar labels.

The return pole 150''' includes a changing saturation magnetization region 154'' that is analogous to the regions 154/154'. In this embodiment, no constant saturation magnetization region 152 is present. The changing saturation magnetization region 154" that includes three layers 155, 156 and 157. Another number of layers may be possible. The $B_s$ of each of the layers 155, 156 and 157 may be constant or varying in the down track direction. In region 154", the saturation magnetization increases toward the interface with the trailing shield. The $B_s$ of the first region 155 is higher than the $B_s$ of the second region 156. Similarly, the $B_s$ of the second region 156 is greater than the $B_s$ of the third region 157. In the embodiment shown, the regions 155, 156 and 157 have thicknesses $t_{RP}$-1, $t_{RP}$-2 and $t_{RP}$-4, respectively. The thicknesses of the regions 155, 156 and 157 may be the same or may differ. The final thicknesses of the regions may depend upon the ability to reliably fabricate the layers. In a manner analogous to the return pole 150" although the top layer 157 is shown, this layer 157 may be partially or completely removed during fabrication. In such embodiments, the layers 155 and 156 are present in the final device. In other embodiments, all or some of the layer 157 is present in the final device.

Performance of the transducer 110 and disk drive 100 may be improved by the return pole 150'''. The region 154" of the return pole 150''' has a higher saturation magnetization that more closely matches the side shield saturation magnetization. The mismatch in magnetic properties between the return pole 150''' and trailing shield 140 may be reduced. This may help address WATER and other issues. Thus, performance of the transducer 110 may be improved.

Figure 12:
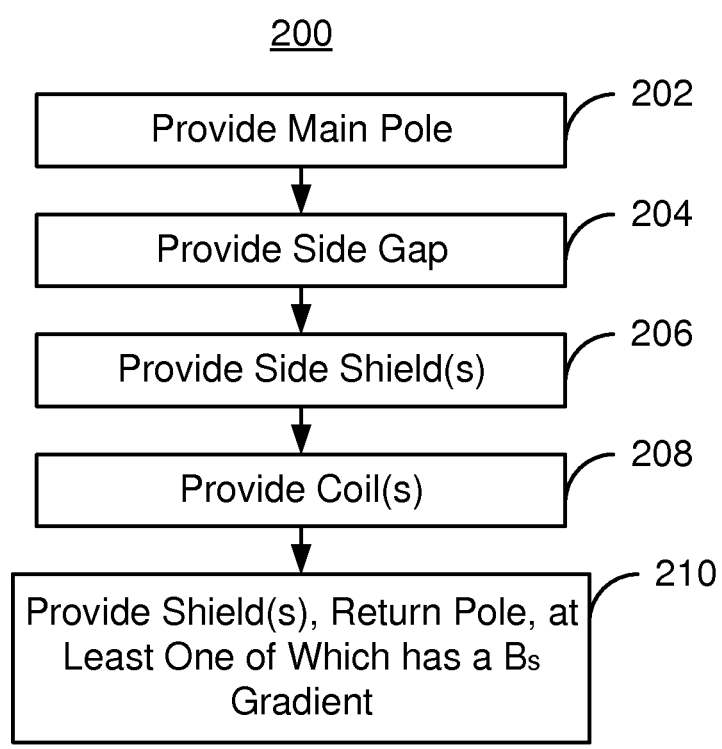
FIG. 12 depicts a flow chart of an exemplary embodiment of a method for providing a magnetic recording transducer having shield(s) and/or a return pole with a gradient in saturation magnetization.

FIG. 12 depicts an exemplary embodiment of a method 200 for providing a magnetic recording transducer or analogous data storage device. For simplicity, some steps may be omitted, interleaved, performed in another order and/or combined. The method 200 may be used to fabricate multiple magnetic recording heads at substantially the same time. The method 200 is described in the context of the magnetic transducer 110. The method 200 is also described in the context of particular layers. A particular layer may include multiple materials and/or multiple sub-layers. The method 200 also may start after formation of other portions of the magnetic recording transducer.

The main pole 114 is formed, via step 202. In some embodiments, step 202 includes forming a trench in one or more nonmagnetic layers. For example, one or more reactive ion etches (RIEs) may form the trench. The trench has a shape and location that corresponds to the pole. In other embodiments the trench may be provided in the side shields. Magnetic material(s) for the pole are deposited. The transducer may then be planarized. A trailing edge bevel may optionally be formed on the trailing surface (top) of the main pole.

The side gap 116 is provided, via step 204. Step 204 may include depositing a Ru layer, for example via chemical vapor deposition, sputtering or another method. Additional layer(s) may also be provided. In some embodiments, step 204 is performed before step 202. Thus, the main pole 110 is provided on the side gap 116 in such embodiments.

The side shields 130 are provided, via step 206. Step 206 may include depositing a high saturation magnetization layer, For example, the side shields 130 may be plated.

The coil(s) 112 for the main pole are provided, via step 208. Step 208 may be interleaved with other steps of the method 200. For example, portions of the coil(s) 112 may be formed before the main pole 114 and side shields 130. The coil(s) formed may be helical coil(s) or spiral coils.

At least one of the leading shield 120/120'/120"/120''', the trailing shield 140/140'/140"/140''' and/or the return pole 150/150'/150"/150''' are provided, via step 208. Step 208 includes forming portions of the leading shield, trailing shield, and/or return pole such that the saturation magnetization increases toward the side shields 130 and the saturation magnetization mismatch at the interface(s) is reduced or eliminated. For example, a gradient in saturation magnetization maybe provided for the leading shield 120/120'/120"/120''' only, the trailing shield 140/140'/140"/140''' only, the return pole 150/150'/150"/150''' only, the leading shield 120/120'/120"/120''' and the trailing shield 140/140'/140"/140''', or the leading shield 120/120'/120"/120''' and the return pole 150/150'/150"/150'''.

Using the method 200, a magnetic transducer having improved performance may be fabricated. Because of the gradient in the saturation magnetization in one or more of the leading shield 120/120'/120"/120''', the trailing shield 140/140'/140"/140''' and the return pole 150/150'/150"/150''', WATER issues may be reduced or eliminated.

Figure 13:
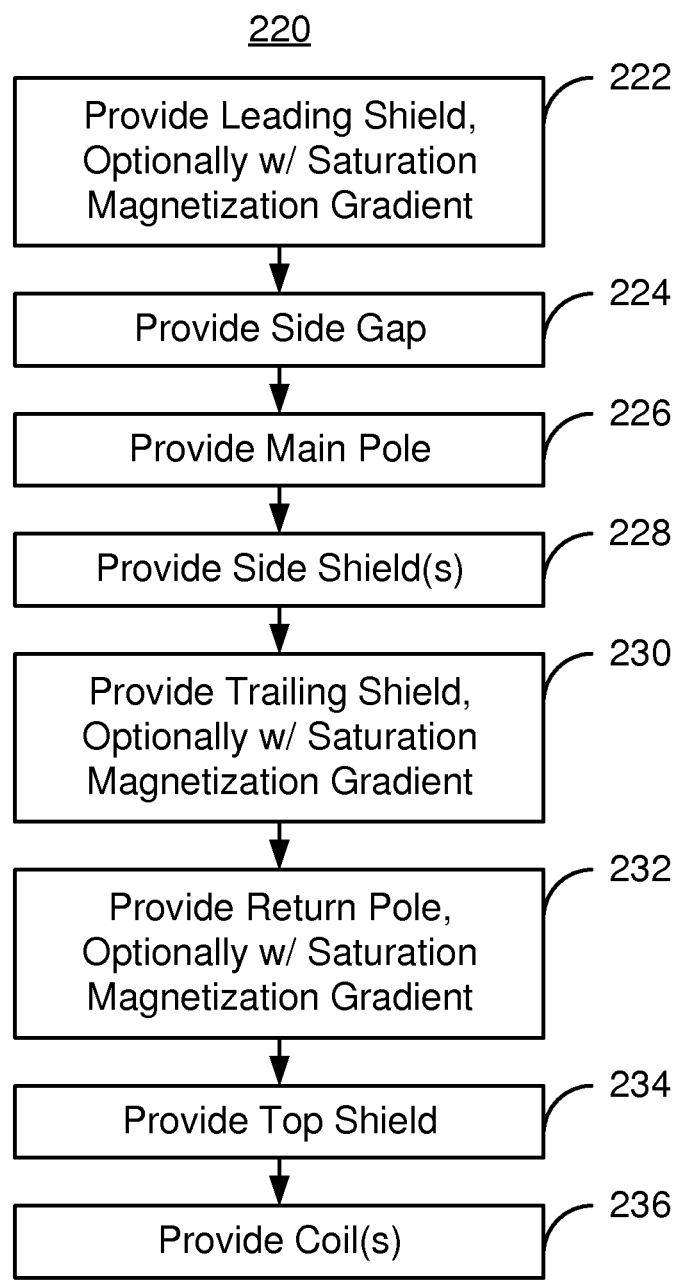
FIG. 13 depicts a flow chart of another exemplary embodiment of a method for providing a magnetic recording transducer having shield(s) and/or a return pole with a gradient in saturation magnetization.

FIG. 13 depicts an exemplary embodiment of a method 220 for providing a magnetic transducer having components that have a gradient in saturation magnetization in the down track direction such that the saturation magnetization mismatch is reduced. For simplicity, some steps may be omitted, interleaved, performed in another order and/or combined. The method 220 is also described in the context of providing a magnetic recording transducer 110 depicted in FIGS. 2A-2B. The method 220 may be used to fabricate multiple magnetic recording heads at substantially the same time. The method 220 may also be used to fabricate other magnetic recording transducers. The method 220 is also described in the context of particular layers. A particular layer may include multiple materials and/or multiple sub-layers. The method 220 also may start after formation of other portions of the magnetic recording transducer. For example, the method 220 may start after a read transducer has been fabricated.

A leading shield 120 that may have a gradient in saturation magnetization is provided, via step 222. In some embodiments, the leading shield fabricated in step 222 may have a gradient in the saturation magnetization such that $B_s$ increases in the down track direction, toward the side shields. In other embodiments, the saturation magnetization for the leading shield 120 may be substantially constant. Step 222 may form any of the leading shields 120, 120', 120", 120''' and/or an analogous leading shield.

A side gap 116 is provided, via step 224. Step 224 may include depositing an intermediate layer on the leading shield 120, forming a trench in the desired location of the pole and having the desired profile, then depositing the side gap material(s) in at least trench. In some embodiments, the side gap 116 include multiple sublayers. The main pole 114 is provided, via step 226. The magnetic material(s) for the pole may be plated and a planarization performed in step 226. Leading and/or trailing bevels in the main pole 114 may also be provided as part of step 226. A top, or write gap layer 118 may also be provided.

The side shields 130 are provided, via step 228. Step 228 may include removing portions of the intermediate layer, depositing seed layer(s) and plating the soft magnetic and/or other material(s) for the side shields 130. Step 228 may be performed before steps 224 and 226 in some embodiments, but after steps 224 and 226 in other embodiments. Alternatively, portions of the steps 224, 226 and 228 may be interleaved.

The trailing shield 140 may be formed, via step 230. In some embodiments, the trailing shield fabricated in step 230 may have a gradient in the saturation magnetization such that $B_s$ increases in the down track direction toward the side shields 130. In other embodiments, the saturation magnetization for the trailing shield 140 may be substantially constant. Step 230 may form any of the trailing shields 140, 140', 140", 140'" and/or an analogous trailing shield.

The return pole 150 may be formed, via step 232. In some embodiments, the return pole 150 fabricated in step 232 may have a gradient in the saturation magnetization such that $B_s$ increases in the down track direction toward the side shields 130. In other embodiments, the saturation magnetization for the return pole 150 may be substantially constant. Step 232 may form any of the return poles 150, 150', 150", 150'" and/or an analogous return pole.

The top shield 150 and coils 112 are provided, via steps 234 and 236, respectively. Portions of step 236 may be interleaved with portions of other steps in the method 220.

Using the method 220, a magnetic transducer having improved performance may be fabricated. Because of the gradient in the saturation magnetization in one or more of the leading shield 120/120'/120"/120'", the trailing shield 140/140'/140"/140'" and the return pole 150/150'/150"/150'", WATER issues may be reduced or eliminated.

Figure 14:
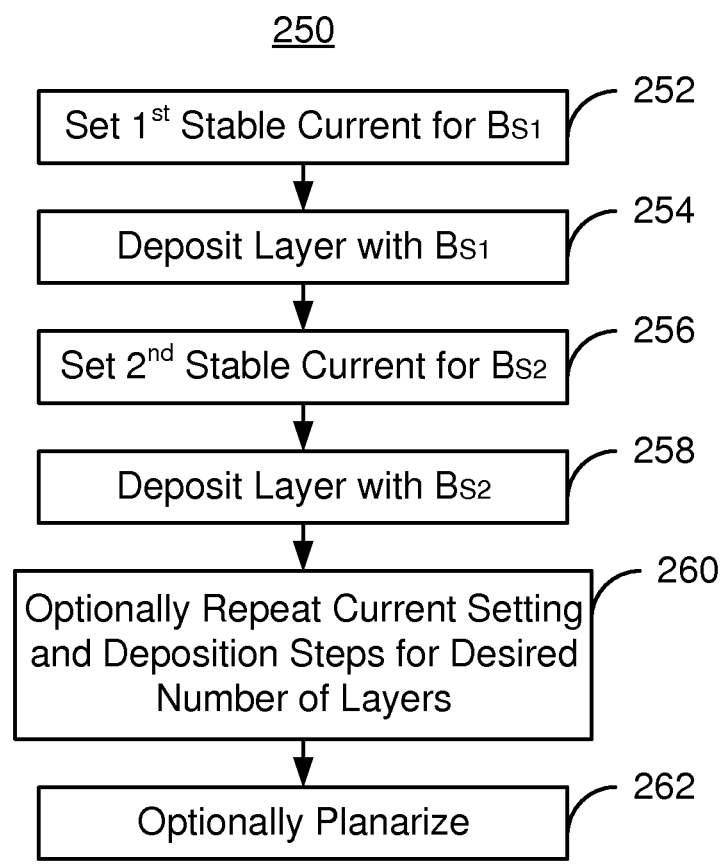
FIG. 14 depicts a flow chart of an exemplary embodiment of a method for providing a shield or return pole having a gradient in saturation magnetization.

FIG. 14 depicts a flow chart of an exemplary embodiment of a method for providing a shield or return pole having a gradient in saturation magnetization. For simplicity, some steps may be omitted, interleaved, performed in another order and/or combined. The method 250 is also described in the context of providing a leading shield 120" depicted in FIG. 4. However, other leading shield(s) 120, 120' and/or 120'" and/or other structures 140, 140', 140", 140'", 150, 150', 150", 150'" may be fabricated using the method 250 The method 250 may be used to fabricate multiple magnetic recording heads at substantially the same time. The method 250 may also be used in fabricating other magnetic recording transducers. The method 250 is also described in the context of particular layers. A particular layer may include multiple materials and/or multiple sub-layers. The method 250 also may start after formation of other portions of the magnetic recording transducer. For example, the method 250 may start after a read transducer has been fabricated.

A current that is stable and provides the material having the desired saturation magnetization, $B_{S1}$, is set, via step 252. For the leading shield 120", the plating bath and/or current set in step 252 are configured to have a lowest saturation magnetization. For example, a saturation magnetization of approximately 1.0 T may be desired for the layer being fabricated. However, for the trailing shield 140' and/or the return pole 150', the plating bath, current set in step 252 and other parameters may be set for the highest saturation magnetization for the structure being fabricated. In some embodiments, setting the current in step 252 may include determining a desired variation in current for the layer being fabricated and setting the system such that the current is varied as desired. Thus, the deposition/plating system may be configured for a constant saturation magnetization layer or a layer in which the saturation magnetization varies.

The first layer 122 of the shield 120" is plated using the current set in step 252, via step 254. Thus, the region 122 for the shield 120" may be formed. In other embodiments, the layer 125, 145, or 155 may be plated in step 254.

A current that is stable and provides the material having the desired saturation magnetization, $B_{S2}$, for the next layer is set, via step 256. For the leading shield 120", the plating bath and/or current set in step 256 are configured to have the next lowest saturation magnetization. For example, a saturation magnetization of approximately 1.6 T may be desired for the 125 layer being fabricated. However, for the trailing shield 140' and/or the return pole 150'150', the plating bath, current set in step 256 and other parameters may be set for the second highest saturation magnetization for the structure being fabricated. In some embodiments, setting the current in step 256 may include determining a desired variation in current for the layer being fabricated and setting the system such that the current is varied as desired. Thus, the deposition/plating system may be configured for a constant saturation magnetization layer or a layer in which the saturation magnetization varies.

The second layer 125 of the shield 120" is plated using the current set in step 256, via step 258. Thus, the region 125 for the shield 120" may be formed. In other embodiments, the layer 146 or 156 may be plated in step 258.

The steps of setting the desired current and plating at the set current may be repeated a desired number of times, via step 260. The current and other parameters set in step 260 are such that the desired saturation magnetization for the next layer(s) 126, 146 and/or 156 are provided. These iterations continue until the structure has been completed with the desired gradient in saturation magnetization. Thus, the leading shield 120/120'/120"/120'", the trailing shield 140/140'/140"/140'" and/or the return pole 150/150'/150"/150'" may have a desired saturation magnetization gradient.

Using the method 250, a magnetic transducer having improved performance may be fabricated. Because of the gradient in the saturation magnetization in one or more of the leading shield 120/120'/120"/120'", the trailing shield 140/140'/140"/140'" and the return pole 150/150'/150"/150'" formed using the method 250, WATER issues may be reduced or eliminated.

We claim:

1. A magnetic recording transducer having air-bearing surface (ABS) comprising:
   a main pole having a leading surface and a trailing surface;
   a side gap;
   at least one coil configured to energize the main pole;
   a side shield, the side gap residing between the side shield and the main pole; and
   at least one of a leading shield, a trailing shield and a return pole, the main pole being between the leading shield and the trailing shield, the trailing shield being between the main pole and the return pole, the side shield being between the leading shield and the trailing shield, the at least one of the leading shield, the trailing shield and the return pole having a gradient in a saturation magnetization such that the saturation magnetization decreases with increasing distance from the main pole in a down track direction, such that the gradient is completely across the at least one of the leading shield, the trailing shield and the return pole in a cross-track direction perpendicular to the down track direction and such that the at least one of the leading shield, the trailing shield and the return pole have at least three different saturation magnetizations.

2. The magnetic recording transducer of claim 1 wherein the at least one of the leading shield, the trailing shield and the return pole has a first portion and a second portion, the first portion being between the second portion and the main pole, the first portion having a first saturation magnetization, the second portion having a second saturation magnetization that is substantially constant, the first saturation magnetization having at least a portion of the gradient in the saturation magnetization.

3. The magnetic recording transducer of claim 2 wherein an other of the at least the leading shield, trailing shield and return pole has an additional gradient in an additional saturation magnetization such that the additional saturation magnetization decreases in the down track direction.

4. The magnetic recording transducer of claim 3 wherein the leading shield has the gradient in the saturation magnetization and the return pole has the additional gradient in the additional saturation magnetization.

5. The magnetic recording transducer of claim 3 wherein the leading shield has the gradient in the saturation magnetization and the trailing shield has the additional gradient in the additional saturation magnetization.

6. The magnetic recording transducer of claim 1 wherein the at least one of the leading shield, the trailing shield and the return pole includes a plurality of layers having a plurality of saturation magnetizations forming the gradient in the saturation magnetization, the plurality of layers including at least three layers, each of the plurality of layers extending completely across the at least one of the leading shield, the trailing shield and the return pole in the cross-track direction, such that the leading shield has a first minimum saturation magnetization of 1.0 T furthest from the main pole in the down track direction and a first maximum saturation magnetization of not more than 2.0 T closest to the main pole in the down track direction if the leading shield has the gradient, the trailing shield has a second minimum saturation magnetization of 1.6 T furthest from the main pole in the down track direction and a second maximum saturation magnetization of not more than 2.0 T closest to the main pole in the down track direction if the trailing shield has the gradient, and the return pole has a third minimum saturation magnetization of 1.6 T furthest from the main pole in the down track direction and a third maximum saturation magnetization of not more than 2.0 T closest to the main pole in the down track direction if the return pole has the gradient.

7. The magnetic recording transducer of claim 1 wherein the leading shield has the gradient in the saturation magnetization.

8. The magnetic recording transducer of claim 1 wherein the trailing shield has the gradient in the saturation magnetization.

9. The magnetic recording transducer of claim 1 wherein the return pole has the gradient in the saturation magnetization.

10. The magnetic recording transducer of claim 1 wherein the gradient in the saturation magnetization is selected from a linear gradient, a piecewise linear gradient, stepped and a smooth curve gradient.

11. The magnetic recording transducer of claim 1 wherein the side shield has a side shield saturation magnetization and the gradient is configured such that the at least one of the leading shield, the trailing shield and the return pole has the side shield saturation magnetization at a surface closest to the side shield.

12. The magnetic recording transducer of claim 1 wherein the side shield and the leading shield share a first interface, the side shield and the trailing shield share a second interface and the trailing shield and the return pole share a third interface, and wherein at least one of the side shield and the leading shield have first matching saturation magnetizations at the first interface, the side shield and the trailing shield have second matching saturation magnetizations at the second interface and the trailing shield and the return pole have third matching saturation magnetizations at the third interface.

13. A data storage device comprising:
a media;
a slider including a magnetic recording transducer having an air-bearing surface (ABS), a main pole, a side gap, at least one coil configured to energize the main pole, a side shield and at least one of a leading shield, a trailing shield and a return pole, the side gap being between the main pole and the side shield, the main pole being between the leading shield and the trailing shield, the side gap residing between the side shield and the main pole, the trailing shield being between the main pole and the return pole, the side shield being between the leading shield and the trailing shield, the at least one of the leading shield, the trailing shield and the return pole having a gradient in a saturation magnetization such that the saturation magnetization decreases with increasing distance from the main pole in a down track direction, such that the gradient is completely across the at least one of the leading shield, the trailing shield and the return pole in a cross-track direction perpendicular to the down track direction and such that the at least one of the leading shield, the trailing shield and the return pole have at least three different saturation magnetizations.

14. A method for providing a magnetic transducer having air-bearing surface (ABS) comprising:
providing a main pole, a portion of the main pole residing at the ABS;
providing a side gap;
providing at least one coil for energizing the main pole; and
providing a side shield, the side gap residing between the side shield and the main pole; and
providing at least one of a leading shield, a trailing shield and a return pole, the main pole being between the leading shield and the trailing shield, the trailing shield being between the main pole and the return pole, the side shield being between the leading shield and the trailing shield, the at least one of the leading shield, the trailing shield and the return pole having a gradient in a saturation magnetization such that the saturation magnetization decreases with increasing distance from the main pole in a down track direction, such that the gradient is completely across the at least one of the leading shield, the trailing shield and the return pole in a cross-track direction perpendicular to the down track direction and such that the at least one of the leading shield, the trailing shield and the return pole have at least three different saturation magnetizations.

15. The method of claim 14 wherein the step of providing the at least one of the leading shield, the trailing shield and the return pole further includes:
providing a first portion of the at least one of the leading shield, the trailing shield and the return pole; and
providing a second portion of the at least one of the leading shield, the trailing shield and the return pole, the first portion being between the second portion and the main pole, the first portion having a first saturation magnetization, the second portion having a second saturation magnetization that is substantially constant, the first saturation magnetization having at least a portion of the gradient in the saturation magnetization.

16. The method of claim 15 wherein the step of providing the first portion further includes:
plating a first layer of the first portion at a first plating current corresponding to a first saturation magnetization;

changing the first plating current to a second plating current;

plating a second layer of the first portion at the second plating current; and optionally repeating the plating and changing steps such that the at least one of the leading shield, the trailing shield and the return pole includes a plurality of layers having a plurality of saturation magnetizations.

17. The method of claim 15 wherein the step of providing the at least one of the leading shield, the trailing shield and the return pole further includes:

providing an other of the at least the leading shield, the trailing shield and the return pole such that the other of the at least the leading shield, the trailing shield and the return pole has an additional gradient in an additional saturation magnetization such that the additional saturation magnetization decreases in the down track direction.

18. The method of claim 14 wherein the gradient in the saturation magnetization is selected from a linear gradient, a piecewise linear gradient, stepped and a smooth curve gradient.

19. The method of claim 14 wherein the side shield has a side shield saturation magnetization and the gradient is configured such that the at least one of the leading shield, the trailing shield and the return pole has the side shield saturation magnetization at a surface closest to the side shield.

20. The method of claim 14 wherein the side shield and the leading shield share a first interface, the side shield and the trailing shield share a second interface and the trailing shield and the return pole share a third interface, and wherein at least one of the side shield and the leading shield have first matching saturation magnetizations at the first interface, the side shield and the trailing shield have second matching saturation magnetizations at the second interface and the trailing shield and the return pole have third matching saturation magnetizations at the third interface.

* * * * *